(12) United States Patent
Gomez et al.

(10) Patent No.: US 7,729,961 B1
(45) Date of Patent: Jun. 1, 2010

(54) SYSTEMS, METHODS, AND COMPUTER-READABLE STORAGE MEDIA FOR ANALYZING HMDA DATA

(75) Inventors: Geni Gomez, Vienna, VA (US); Keith Bickel, McLean, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 36 days.

(21) Appl. No.: 12/081,307

(22) Filed: Apr. 14, 2008

Related U.S. Application Data

(60) Provisional application No. 60/907,700, filed on Apr. 13, 2007.

(51) Int. Cl.
G07B 17/00 (2006.01)
G07F 19/00 (2006.01)
G06F 17/22 (2006.01)

(52) U.S. Cl. .......................................... 705/30; 705/31
(58) Field of Classification Search ..................... 705/30
See application file for complete search history.

(56) References Cited

U.S. PATENT DOCUMENTS

| | | | |
|---|---|---|---|
| 6,993,505 B1* | 1/2006 | Katz et al. ..................... 705/38 |
| 7,010,495 B1* | 3/2006 | Samra et al. ................... 705/10 |
| 7,181,422 B1* | 2/2007 | Philip et al. ............... 705/36 R |
| 7,246,078 B2* | 7/2007 | Vincent ........................ 705/10 |
| 7,392,240 B2* | 6/2008 | Scriffignano et al. ........... 707/3 |
| 7,398,245 B1* | 7/2008 | Bent et al. ..................... 705/38 |
| 2001/0047326 A1* | 11/2001 | Broadbent et al. ............. 705/38 |
| 2002/0194120 A1* | 12/2002 | Russell et al. ................. 705/38 |
| 2003/0014335 A1* | 1/2003 | Lecheler-Moore et al. .... 705/30 |
| 2003/0033241 A1* | 2/2003 | Harari .......................... 705/38 |
| 2004/0181436 A1* | 9/2004 | Lange ............................ 705/4 |
| 2004/0236653 A1* | 11/2004 | Sokolic et al. ................. 705/35 |
| 2005/0038721 A1* | 2/2005 | Goeckel et al. ............... 705/30 |
| 2006/0047724 A1* | 3/2006 | Messing et al. ............. 707/204 |
| 2006/0059073 A1* | 3/2006 | Walzak ......................... 705/35 |
| 2006/0187889 A1* | 8/2006 | Mehta et al. ................. 370/338 |
| 2006/0229958 A1* | 10/2006 | Sergio et al. ................... 705/35 |
| 2006/0282371 A1* | 12/2006 | Doyle et al. ................... 705/38 |
| 2007/0050286 A1* | 3/2007 | Abrahams et al. ............. 705/38 |
| 2007/0192209 A1* | 8/2007 | Ronan et al. ................... 705/26 |
| 2008/0071676 A1* | 3/2008 | Vagim et al. .................. 705/38 |
| 2008/0081601 A1* | 4/2008 | Moshir et al. ............... 455/418 |

(Continued)

FOREIGN PATENT DOCUMENTS

WO  WO 9913425 A1 * 3/1999

OTHER PUBLICATIONS

Integrating HMDA data into fair lending and CRA planning by Theberath Mary: Mar. 1995 vol. 79 Issue 3, pp. 16, 6 pages.*

*Primary Examiner*—Matthew S Gart
*Assistant Examiner*—Harshad Parikh
(74) *Attorney, Agent, or Firm*—Finnegan, Henderson, Farabow, Garrett & Dunner LLP

(57) ABSTRACT

Systems, methods, and computer-readable storage media are described for normalizing HMDA data. In one exemplary embodiment, a computer-implemented method of normalizing HMDA data comprises receiving HMDA data including at least one of HMDA data reports and loan-level public HMDA data, the HMDA data having information that varies as a function of time; correcting errors in the HMDA data; normalizing the HMDA data across any variation in the information; summarizing the normalized HMDA data; and outputting the summarized and normalized HMDA data to an application for analysis.

20 Claims, 15 Drawing Sheets

U.S. PATENT DOCUMENTS

2008/0147523 A1* 6/2008 Mulry et al. .................. 705/30
2008/0154753 A1* 6/2008 Weiss ........................... 705/30
2009/0055297 A1* 2/2009 Gunderman ................. 705/30
2009/0063328 A1* 3/2009 Cuscovitch et al. ........... 705/38
2009/0150266 A1* 6/2009 Dickelman ................... 705/30

* cited by examiner

| Application or Loan Number | | | | | | | Action Taken | | | Property Location | | | | Applicant Information A = Applicant CA = Co-Applicant | | | | Other Data | | | | |
|---|---|---|---|---|---|---|---|---|---|---|---|---|---|---|---|---|---|---|---|---|---|---|
| Application or Loan Number | Date Application Received | Loan Type | Property Type | Purpose | Owner Occupancy | Loan Amount | Pre-Approval | Type | Date | Five Digit MS A/MD Number | Two Digit State Code | Three Digit County Code | Six Digit Census Tract | Ethnicity | | Race | | Sex | | Gross Annual Income in Thousands | Type of Purchaser of Loan | Reason For Denial (Optional) | Rate Spread | HOEPA Status | Lien Status |
| | | | | | | | | | | | | | | A | CA | A | CA | A | CA | | | | | | |
| Example of Loan Originated Following PreApproval LB-687439 | 1/15/08 | 1 | 1 | 1 | 1 | 65 | 1 | 1 | 2/22/08 | 47894 | 51 | 69 | 4219-85 | 2 | 5 | 35 | 5 | 1 | 5 | 24 | 7 | | NA | 2 | 1 |
| 5678904321 1234098765 | 6/1/08 | 1 | 1 | 1 | 1 | 125 | 1 | 7 | 6/20/08 | NA | NA | NA | NA | 2 | 2 | 3 | 2 | 1 | 2 | 40 | 0 | 1, 3 | NA | 2 | 1 |
| 5678904321 1234098765 | 3/20/08 | 1 | 1 | 1 | 1 | 30 | 1 | 3 | 4/30/08 | 11500 | 01 | 015 | 0021-00 | 1 | 1 | 5 | 3 | 2 | 1 | 20 | 0 | 4, 5 | NA | 2 | 1 |
| (A) | (B) | (C) | (D) | (E) | (F) | (G) | (H) | (I) | (J) | (K) | (L) | (M) | (N) | (O) | (P) | (Q) | (R) | (S) | (T) | (U) | (V) | (W) | (X) | (Y) | (Z) |

LOAN/APPLICATION REGISTER CODE SHEET

| Application or Loan Information | Action Taken: (I) | Type of Purchaser (V) |
|---|---|---|
| Loan Type: (C)<br>1 -- Conventional (any loan other than FHA, VA, FSA, or RHS loans)<br>2 -- FHA-insured (Federal Housing Administration)<br>3 -- VA-guaranteed (Veterans Administration)<br>4 -- FSA/RHS-guaranteed (Farm Service Agency or Rural Housing Service) | 1 -- Loan originated<br>2 -- Application approved but not accepted<br>3 -- Application denied by financial institution<br>4 -- Application withdrawn by applicant<br>5 -- File closed for incompleteness<br>6 -- Loan purchased by your institution<br>7 -- Preapproval request denied by financial institution<br>8 -- Preapproval request approved but not accepted (optional reporting) | 0 -- Loan was not originated or was not sold in calendar year<br>1 -- Fannie Mae<br>2 -- Ginnie Mae<br>3 -- Freddie Mae<br>4 -- Farmer Mae<br>5 -- Private securization<br>6 -- Commercial bank, savings bank or savings association<br>7 -- Life insurance company, credit union, mortgage bank, or finance company<br>8 -- Affiliate institution<br>9 -- Other type of purchaser |
| Property Type: (D)<br>1 -- One-to-four family (other than manufactured housing)<br>2 -- Manufactured housing<br>3 -- Multifamily | Applicant Information<br>Ethnicity: (O) (P)<br>1 -- Hispanic or Latino<br>2 -- Not Hispanic or Latino<br>3 -- Information not provided by applicant in mail, Internet, or telephone application (see App. A, I.D.2.)<br>4 -- Not applicable<br>5 -- No co-applicant | Reasons for Denial (optional reporting) (W)<br>1 -- Debt-to-income ratio<br>2 -- Employment history<br>3 -- Credit history<br>4 -- Collateral<br>5 -- Insufficient cash (down payment closing costs)<br>6 -- Unverifiable information<br>7 -- Credit application incomplete<br>8 -- Mortgage insurance denied<br>9 -- Other |
| Purpose of loan: (E)<br>1 -- Home purchase<br>2 -- Home improvement<br>3 -- Refinancing | Race: (Q) (R)<br>1 -- American Indian or Alaska Native<br>2 -- Asian<br>3 -- Black or African American<br>4 -- Native Hawaiian or Other Pacific Islander<br>5 -- White<br>6 -- Information not provided by applicant in mail, Internet, or telephone application (see App. A, I.D.2.)<br>7 -- Not applicable<br>8 -- No co-applicant | Other Data<br>HOEPA Status<br>(only for loans originated or purchased): (Y)<br>1 -- HOEPA loan<br>2 -- Not a HOEPA loan |
| Owner-Occupancy: (F)<br>1 -- Owner-occupied as a principal dwelling<br>2 -- Not owner-occupied<br>3 -- Not applicable | Sex: (S) (T)<br>1 -- Male<br>2 -- Female<br>3 -- Information not provided by applicant in mail, Internet, or telephone application (see App. A, I.D.2.)<br>4 -- Not applicable<br>5 -- No co-applicant | Lien Status (only for applications and originations): (Z)<br>1 -- Secured by a first lien<br>2 -- Secured by a subordinate lien<br>3 -- Not secured by a lien<br>4 -- Not applicable (purchased loans) |
| Preapproval (home purchase loans only): (H)<br>1 -- Preapproval was requested<br>2 -- Preapproval was not requested<br>3 -- No applicable | | |

FIG. 2B

| CENSUS TRACT OR COUNTY NAME AND DISPOSITION OF APPLICATION 1/ (STATE/COUNTY/TRACT NUMBER) | Loans on 1-to-4 Family and Manufactured Home Dwellings | | | | | | | MSA/MD: 47894 WASHINGTON ARLINGTON ALEXANDRIA | | | | | |
|---|---|---|---|---|---|---|---|---|---|---|---|---|---|
| | Home Purchase Loans | | | | Refinancings C | | Home Improvements Loans D | | Loans on Dwellings For 5 or More Families E | | Nonoccupant Loans From Columns A, B, C and D F | | Loans On Manufactured Home Dwelling From Columns A, B, C & D G |
| | FHA, FSA/RHS & VA A | | Conventional B | | | | | | | | | | |
| | Number | $000's | Number | $000's | Number | $000's | Number | $000's | Number | $000's | Number | $000's | Number $000's |
| DC/DISTRICT OF COLUMBIA/0099.05 | | | | | | | | | | | | | |
| LOANS ORIGINATED | | | 1 | 215 | 1 | 179 | | | | | | | |
| APPROVED, NOT ACCEPTED | | | | | | | | | | | | | |
| APP DENIED | | | | | | | | | | | | | |
| APP WITHDRAWN | | | | | | | | | | | | | |
| FILES CLOSED FOR INCOMPLETENESS | | | | | | | | | | | | | |
| DC/DISTRICT OF COLUMBIA/0099.06 | | | | | | | | | | | | | |
| LOANS ORIGINATED | | | 2 | 265 | | | | | | | 1 | 165 | |
| APPROVED, NOT ACCEPTED | | | | | | | | | | | | | |
| APP DENIED | | | | | | | | | | | | | |
| APP WITHDRAWN | | | | | | | | | | | | | |
| FILES CLOSED FOR INCOMPLETENESS | | | | | | | | | | | | | |
| DC/DISTRICT OF COLUMBIA/0099.07 | | | | | | | | | | | | | |
| LOANS ORIGINATED | | | 3 | 472 | | | | | | | | | |
| APPROVED, NOT ACCEPTED | | | 2 | 268 | | | | | | | | | |
| APP DENIED | | | | | | | | | | | | | |
| APP WITHDRAWN | | | | | | | | | | | | | |
| FILES CLOSED FOR INCOMPLETENESS | | | | | | | | | | | | | |
| MD/CALVERT COUNTY/8601.01 | | | | | | | | | | | | | |
| LOANS ORIGINATED | | | | | 2 | 550 | | | | | | | |
| APPROVED, NOT ACCEPTED | | | | | | | | | | | | | |
| APP DENIED | | | | | | | | | | | | | |
| APP WITHDRAWN | | | | | | | | | | | | | |
| FILES CLOSED FOR INCOMPLETENESS | | | | | | | | | | | | | |
| MD/CALVERT COUNTY/8601.02 | | | | | | | | | | | | | |
| LOANS ORIGINATED | | | 3 | 739 | 2 | 845 | | | | | 1 | 390 | |
| APPROVED, NOT ACCEPTED | | | | | | | | | | | | | |
| APP DENIED | | | 1 | 380 | | | | | | | | | |
| APP WITHDRAWN | | | | | | | | | | | | | |
| FILES CLOSED FOR INCOMPLETENESS | | | | | | | | | | | | | |
| MD/CALVERT COUNTY/8602.00 | | | | | | | | | | | | | |
| LOANS ORIGINATED | | | 3 | 1570 | 7 | 3104 | | | | | | | |
| APPROVED, NOT ACCEPTED | | | | | | | | | | | | | |
| APP DENIED | | | | | | | | | | | | | |
| APP WITHDRAWN | | | | | | | | | | | | | |
| FILES CLOSED FOR INCOMPLETENESS | | | | | | | | | | | | | |

FIG. 3A

AGGREGATE TABLE 1: DISPOSITION OF LOAN APPLICATIONS BY LOCATION OF PROPERTY AND TYPE OF LOAN, 2006

ALL LOANS ON PROPERTY LOCATED IN MSA/MD 3/  MSA/MD: 47894 WASHINGTON ARLINGTON ALEXANDRIA

| CENSUS TRACT OR COUNTY NAME AND DISPOSITION OF APPLICATION 1/ (STATE/COUNTY/TRACT NUMBER) | Loans on 1to-4 Family and Manufactured Home Dwellings | | | | | | | | | | | Loans on Dwellings For 5 or More Families E | | Nonoccupant Loans From Columns A, B, C and D F | | Loans On Manufactured Home Dwelling From Columns A, B, C & D G | | % Min Pop 4/ | Median Income As PCT of MSA/MD Median |
|---|---|---|---|---|---|---|---|---|---|---|---|---|---|---|---|---|---|---|---|
| | Home Purchase Loans | | | | Refinancings C | | Home Improvement Loans D | | | | | | | | | | | |
| | FHA, FSA/RHS & VA A | | Conventional B | | | | | | | | | | | | | | | | |
| | Number | $000's | Number | $000's | Number | $000's | Number | $000's | | | Number | $000's | Number | $000's | Number | $000's | | |
| DC/DISTRICT OF COLUMBIA/0099.04 | | | | | | | | | | | | | | | | | 99 | 37 |
| LOANS ORIGINATED | | | 52 | 6752 | 42 | 5305 | 5 | 1728 | | | 1 | 410 | 20 | 3724 | | | | |
| APPROVED, NOT ACCEPTED | | | 3 | 491 | 2 | 344 | 1 | 10 | | | | | 1 | 131 | | | | |
| APP DENIED | | | 15 | 2681 | 11 | 1359 | 1 | 125 | | | | | 3 | 450 | | | | |
| APP WITHDRAWN | | | 5 | 771 | 2 | 374 | | | | | | | | | | | | |
| FILES CLOSED FOR INCOMPLETENESS | | | 2 | 396 | 3 | 586 | | | | | | | 1 | 279 | | | | |
| DC/DISTRICT OF COLUMBIA/0099.05 | | | | | | | | | | | | | | | | | 100 | 32 |
| LOANS ORIGINATED | | | 62 | 9910 | 88 | 14290 | 8 | 581 | | | 3 | 1845 | 33 | 5336 | | | | |
| APPROVED, NOT ACCEPTED | | | 7 | 912 | 7 | 1108 | | | | | | | 6 | 924 | | | | |
| APP DENIED | | | 30 | 5229 | 49 | 7810 | 7 | 481 | | | | | 18 | 2917 | | | | |
| APP WITHDRAWN | | | 8 | 1307 | 24 | 3462 | 1 | 104 | | | | | 2 | 392 | | | | |
| FILES CLOSED FOR INCOMPLETENESS | | | 3 | 512 | 6 | 1264 | | | | | | | 1 | 158 | | | | |
| DC/DISTRICT OF COLUMBIA/0099.06 | 1 | 147 | | | | | | | | | | | | | | | 99 | 50 |
| LOANS ORIGINATED | | | 53 | 7009 | 36 | 5821 | 7 | 552 | | | 1 | 3650 | 7 | 997 | | | | |
| APPROVED, NOT ACCEPTED | | | 2 | 296 | 11 | 1789 | 1 | 400 | | | | | 1 | 192 | | | | |
| APP DENIED | | | 25 | 3236 | 33 | 5712 | 5 | 314 | | | | | 12 | 1699 | | | | |
| APP WITHDRAWN | | | 6 | 558 | 10 | 2103 | 1 | 65 | | | | | 5 | 628 | | | | |
| FILES CLOSED FOR INCOMPLETENESS | | | 1 | 88 | 5 | 944 | | | | | | | 1 | 186 | | | | |
| DC/DISTRICT OF COLUMBIA/0099.07 | 1 | 271 | | | | | | | | | | | | | | | 99 | 27 |
| LOANS ORIGINATED | | | 29 | 4845 | 66 | 10328 | 6 | 587 | | | | | 13 | 2078 | | | | |
| APPROVED, NOT ACCEPTED | | | 9 | 1411 | 7 | 963 | 2 | 105 | | | | | 1 | 80 | | | | |
| APP DENIED | | | 10 | 1699 | 30 | 5938 | 5 | 273 | | | | | 5 | 931 | | | | |
| APP WITHDRAWN | | | 4 | 712 | 15 | 2670 | | | | | | | 1 | 142 | | | | |
| FILES CLOSED FOR INCOMPLETENESS | | | | | 2 | 381 | 1 | 25 | | | | | | | | | | |
| MD/CALVERT COUNTY/8601.01 | 1 | 330 | | | | | | | | | | | | | | | 9 | 136 |
| LOANS ORIGINATED | | | 57 | 22213 | 93 | 29925 | 20 | 2152 | | | | | 1 | 231 | 1 | 34 | | |
| APPROVED, NOT ACCEPTED | | | 4 | 1414 | 15 | 3807 | 3 | 173 | | | | | | | 1 | 70 | | |
| APP DENIED | | | 11 | 3407 | 19 | 8479 | 8 | 783 | | | | | | | | | | |
| APP WITHDRAWN | | | 4 | 1534 | 18 | 4369 | 2 | 414 | | | | | 2 | 371 | | | | |
| FILES CLOSED FOR INCOMPLETENESS | | | 5 | 2188 | 7 | 3161 | 2 | 630 | | | | | | | | | | |
| MD/CALVERT COUNTY/860020 | 1 | 540 | | | | | | | | | | | | | | | 8 | 121 |
| LOANS ORIGINATED | | | 49 | 16880 | 73 | 21843 | 20 | 2027 | | | | | 3 | 1216 | | | | |
| APPROVED, NOT ACCEPTED | | | 4 | 899 | 16 | 4777 | 5 | 483 | | | | | | | | | | |
| APP DENIED | | | 13 | 4805 | 24 | 6450 | 9 | 901 | | | | | 3 | 960 | 3 | 106 | | |
| APP WITHDRAWN | | | 5 | 1546 | 17 | 5793 | 2 | 485 | | | | | 1 | 160 | | | | |
| FILES CLOSED FOR INCOMPLETENESS | | | 1 | 425 | 6 | 1822 | | | | | | | | | | | | |

FIG. 3B

NATIONAL AGGREGATE TABLE 3-1: LOANS SOLD, BY CHARACTERISTICS OF BORROWER AND OF CENSUS TRACT IN WHICH PROPERTY IS LOCATED AND BY TYPE OF PURCHASER (INCLUDES ORIGINATIONS AND PURCHASED LOANS), 2006.

FINAL 2006 NATIONAL AGGREGATES

| BORROWER OR CENSUS TRACT CHARACTERISTICS | FANNIE MAE | | GINNIE MAE | | FREDDIE MAC | | FARMER MAC | |
|---|---|---|---|---|---|---|---|---|
| | Number | $000's | Number | $000's | Number | $000's | Number | $000's |
| BORROWER CHARACTERISTICS | | | | | | | | |
| RACE 5/ | | | | | | | | |
| AMERICAN INDIAN/ALASKA NATIVE | 9830 | 1906913 | 2019 | 283142 | 5287 | 1015074 | 11 | 1667 |
| ASIAN | 74132 | 17758732 | 3179 | 557173 | 49851 | 12083341 | 22 | 4496 |
| BLACK OR AFRICAN AMERICAN | 109171 | 18572123 | 42551 | 6439563 | 49112 | 8730184 | 4 | 407 |
| NAT HAWAIIAN/OTHER PACIFIC ISLND | 7283 | 1666319 | 2499 | 401599 | 4009 | 913288 | 431 | 60087 |
| WHITE | 1403912 | 255922269 | 251114 | 36041000 | 945786 | 173163928 | | |
| 2 OR MORE MINORITY RACES | 808 | 165402 | 174 | 30651 | 406 | 86304 | | |
| JOINT (WHITE/MINORITY RACE) | 21029 | 4504511 | 6309 | 1094088 | 14124 | 3105705 | 5 | 1287 |
| RACE NOT AVAILABLE 6/ | 566672 | 119245192 | 126592 | 20458133 | 290481 | 58587286 | 117 | 22411 |
| ETHNICITY 7/ | | | | | | | | |
| HISPANIC OR LATINO | 160122 | 31435053 | 33014 | 4585287 | 77470 | 15164097 | 45 | 7929 |
| NOT HISPANIC OR LATINO | 1470699 | 269083509 | 269674 | 39325246 | 984401 | 181984620 | 429 | 60390 |
| JOINT (HISPANIC OR LATINO/ NOT HISPANIC OR LATINO) | 23753 | 5024972 | 7054 | 1173874 | 16249 | 3448552 | 3 | 850 |
| ETHNICITY NOT AVAILABLE 6/ | 558263 | 114191927 | 124695 | 20220942 | 280936 | 57087841 | 113 | 21186 |
| MINORITY STATUS 8/ | | | | | | | | |
| WHITE NON-HISPANIC | 1224892 | 220705980 | 213759 | 30696842 | 853392 | 154821317 | 383 | 51610 |
| OTHERS, INCLUDING HISPANIC | 393451 | 78401965 | 93699 | 14069614 | 209824 | 43151072 | 90 | 16636 |
| INCOME 9/ | | | | | | | | |
| LESS THAN 50% OF MSA/MD MEDIAN | 118079 | 11061400 | 26873 | 2294995 | 63429 | 5975325 | 48 | 4000 |
| 50-79% OF MSA/MD MEDIAN | 351048 | 46781088 | 102668 | 12494185 | 197512 | 25904354 | 209 | 25495 |
| 80-99% OF MSA/MD MEDIAN | 269051 | 44058554 | 73762 | 10919744 | 163633 | 26517375 | 83 | 12146 |
| 100-119% OF MSA/MD MEDIAN | 239056 | 43897586 | 57416 | 9372022 | 152473 | 27738888 | 44 | 8420 |
| 120% OR MORE OF MSA/MD MEDIAN | 934210 | 211299170 | 101045 | 18557853 | 588404 | 133294734 | 113 | 29670 |
| INCOME NOT AVAILABLE 6/ | 293556 | 61530030 | 72294 | 11606204 | 188934 | 37424794 | 84 | 7882 |
| CENSUS TRACT CHARACTERISTICS 10/ | | | | | | | | |
| RACIAL/ETHNIC COMPOSITION 11/ | | | | | | | | |
| LESS THAN 10% MINORITY | 781549 | 138457912 | 136684 | 19571953 | 533621 | 94296587 | 288 | 39485 |
| 10-19% MINORITY | 511352 | 98363699 | 99784 | 15717978 | 326734 | 63262614 | 115 | 15379 |
| 20-49% MINORITY | 5758321 | 113301516 | 129196 | 19962728 | 336189 | 66849421 | 102 | 16109 |
| 50-79% MINORITY | 202114 | 41953034 | 41907 | 5972542 | 101967 | 21169082 | 39 | 7607 |
| 80-100% MINORITY | 132587 | 26362663 | 26475 | 4018423 | 55341 | 11202322 | 37 | 9033 |
| INCOME 12/13/ | | | | | | | | |
| LOW INCOME | 35627 | 6097353 | 5427 | 1019670 | 15458 | 2747452 | 6 | 1858 |
| MODERATE INCOME | 298501 | 50185045 | 66221 | 9300236 | 146557 | 24366818 | 103 | 16726 |
| MIDDLE INCOME | 1156893 | 205043234 | 266501 | 38921985 | 720633 | 126653849 | 389 | 54054 |
| UPPER INCOME | 711909 | 156977466 | 95864 | 15996013 | 470782 | 102900701 | 83 | 14975 |
| TOTAL 14/ | 2212837 | 419741461 | 434437 | 65305349 | 1359056 | 257685110 | 590 | 90355 |

FIG. 3C

NATIONAL AGGREGATE TABLE 3-1: LOANS SOLD, BY CHARACTERISTICS OF BORROWER AND OF CENSUS TRACT IN WHICH PROPERTY IS LOCATED AND BY TYPE OF PURCHASER (INCLUDES ORIGINATIONS AND PURCHASED LOANS), 2006.

FINAL 2006 NATIONAL AGGREGATES

| BORROWER OR CENSUS TRACT CHARACTERISTICS | PRIVATE SECURITIZATION | | COMMERCIAL BANK, SAVINGS BANK, OR SAVING ASSOC | | INSURANCE CO, CREDIT UNION, MORTGAGE BK, OR FINANCE CO | | AFFILIATE OF INSTITUTION | | OTHER PURCHASER | |
|---|---|---|---|---|---|---|---|---|---|---|
| | Number | $000's | Number | $000's | Number | $000's | Number | $000's | Number | $000's |
| BORROWER CHARACTERISTICS | | | | | | | | | | |
| RACE 5/ | | | | | | | | | | |
| AMERICAN INDIAN/ALASKA NATIVE | 9359 | 2367661 | 3939 | 873244 | 9611 | 1864014 | 10637 | 2206198 | 15697 | 3252724 |
| ASIAN | 52787 | 18156643 | 29607 | 9104522 | 59339 | 15374471 | 79217 | 22789013 | 98908 | 27022183 |
| BLACK OR AFRICAN AMERICAN | 146800 | 27259533 | 59480 | 10139389 | 174852 | 29254236 | 163932 | 27575349 | 281417 | 46871651 |
| NAT HAWAIIAN/OTHER PACIFIC ISLND | 8352 | 2427911 | 3731 | 948361 | 11085 | 2621997 | 9788 | 2435187 | 32047 | 10432221 |
| WHITE | 775021 | 183016628 | 533215 | 112018364 | 1155944 | 211960458 | 1352218 | 269184646 | 1729513 | 335530609 |
| 2 OR MORE MINORITY RACES | 724 | 175380 | 340 | 75243 | 798 | 159283 | 1239 | 279794 | 976 | 200302 |
| JOINT (WHITE/MINORITY RACE) | 11538 | 3116046 | 8504 | 2228583 | 16830 | 3486527 | 20751 | 4894833 | 26533 | 5923725 |
| RACE NOT AVAILABLE 6/ | 741029 | 167090118 | 308638 | 57674703 | 437576 | 84883277 | 773525 | 168181806 | 558972 | 114785111 |
| ETHNICITY 7/ | | | | | | | | | | |
| HISPANIC OR LATINO | 217027 | 50852457 | 83866 | 17371357 | 240312 | 47484239 | 248455 | 50642863 | 406142 | 83684144 |
| NOT HISPANIC OR LATINO | 785185 | 184607704 | 556382 | 118055776 | 1189461 | 216509852 | 1367897 | 273094013 | 1794308 | 344284468 |
| JOINT (HISPANIC OR LATINO/ NOT HISPANIC OR LATINO) | 13666 | 3447989 | 8983 | 2136795 | 19127 | 3872755 | 22088 | 4810526 | 30967 | 6444163 |
| ETHNICITY NOT AVAILABLE 6/ | 729732 | 164701770 | 298223 | 55498481 | 417135 | 81734417 | 772867 | 168999424 | 512646 | 109605751 |
| MINORITY STATUS 8/ | | | | | | | | | | |
| WHITE NON-HISPANIC | 559184 | 132279258 | 445245 | 93539580 | 909841 | 163461309 | 1087279 | 214240390 | 1325886 | 252260597 |
| OTHERS, INCLUDING HISPANIC | 446377 | 104283172 | 192924 | 41621546 | 517013 | 101053467 | 539386 | 112027291 | 865855 | 178194321 |
| INCOME 9/ | | | | | | | | | | |
| LESS THAN 50% OF MSA/MD MEDIAN | 39333 | 3634434 | 30827 | 2817139 | 70367 | 6516400 | 87650 | 7873810 | 108771 | 9702088 |
| 50-79% OF MSA/MD MEDIAN | 163652 | 18967912 | 108904 | 13151853 | 255807 | 30317080 | 304231 | 35449650 | 378642 | 43350577 |
| 80-99% OF MSA/MD MEDIAN | 143487 | 20515804 | 85182 | 12367323 | 209456 | 29694511 | 251363 | 34961384 | 308479 | 42879908 |
| 100-119% OF MSA/MD MEDIAN | 132789 | 22006068 | 79715 | 13014227 | 193404 | 30549763 | 238567 | 37370779 | 283583 | 44995416 |
| 120% OR MORE OF MSA/MD MEDIAN | 645557 | 197850219 | 376581 | 103970142 | 781485 | 180887996 | 1141415 | 294338820 | 1254003 | 316677277 |
| INCOME NOT AVAILABLE 6/ | 619454 | 140406101 | 262028 | 46950528 | 328420 | 66117520 | 372558 | 76131234 | 386786 | 81542832 |
| CENSUS TRACT CHARACTERISTICS 10/ | | | | | | | | | | |
| RACIAL/ETHNIC COMPOSITION 11/ | | | | | | | | | | |
| LESS THAN 10% MINORITY | 396501 | 80675732 | 271449 | 50997044 | 495131 | 84500813 | 705931 | 130703691 | 695425 | 123748793 |
| 10-19% MINORITY | 339304 | 83326154 | 209584 | 44607295 | 383445 | 73026430 | 526493 | 111278692 | 557312 | 113299556 |
| 20-49% MINORITY | 522760 | 127553324 | 270729 | 57327792 | 530152 | 101557885 | 680394 | 144038665 | 805152 | 166112245 |
| 50-79% MINORITY | 265984 | 63808854 | 111635 | 23555645 | 241982 | 48267753 | 278650 | 59584074 | 378466 | 78851781 |
| 80-100% MINORITY | 217326 | 47593142 | 79020 | 15660024 | 187549 | 36649249 | 203466 | 40367530 | 282194 | 56855252 |
| INCOME 12/ 13/ | | | | | | | | | | |
| LOW INCOME | 51662 | 9461065 | 20804 | 3656670 | 44894 | 744230 | 51459 | 8730127 | 69762 | 12083978 |
| MODERATE INCOME | 328966 | 60795094 | 146830 | 24104323 | 318111 | 51132458 | 365987 | 60203242 | 483390 | 80470179 |
| MIDDLE INCOME | 853624 | 170990339 | 464889 | 81340491 | 932193 | 158151036 | 1198704 | 211818832 | 1376964 | 243925449 |
| UPPER INCOME | 507127 | 161543767 | 309551 | 82949314 | 542588 | 127152880 | 777765 | 204902523 | 787568 | 202143203 |
| TOTAL 14/ | 1745610 | 403609920 | 947454 | 193062409 | 1866035 | 349601263 | 2411307 | 497546826 | 2744063 | 544018526 |

FIG. 3D

| Variable type | Variable name | Handle 1 | Handle 2 | Handle 3 | Description | Sample Value |
|---|---|---|---|---|---|---|
| Attribute variables | ASOFDT | 1996 | 1997 | 1998 | HMDA Year | 1995, yyyy |
| | PROPTYPE | F | F | M | Property type | F: 1-4-unit Single Family<br>M: Multifamily |
| | LNTYPE | C | G | C | Loan type | C: Conventional<br>G: Government |
| | LIMIT | C | C | J | Limit type | C: Conforming<br>J: Jumbo |
| | RATE | S | P | P | Rate type | P: Prime<br>S: Subprime |
| | LNPURP | R | P | O | Loan purpose | R: Refinance<br>P: Purchase<br>O: Other |
| | OCCPNCY | N | O | N | Occupancy status | O: Owner-occupied<br>N: Not owner-occupied |
| | LIEN | F | O | O | Lien status | F: First lien<br>O: Other (subordinate/unknown) |
| | ACTION | P | O | O | Action taken | O: Originated by lender<br>P: Purchased by lender |
| | PURTYPE | FR | FN | OT | Purchaser type | FR: Freddie Mac<br>FN: Fannie Mae<br>OT: Other |
| | METRO | M | N | M | Metro area indicator | M: Metro<br>N: Non-metro |
| | MINORITY | W | M | W | Minority indicator | W: White-Caucasian<br>M: Minority |
| | INCCAT | 70 | 100 | 120 | Income category | 120: 120% of area median income<br>100: Area median income<br>70: 70% of area median income |
| | LIMITPCT | 20 | 10 | 300 | Loan amount to conforming limit ratio | 20: 20% of conforming limit for filing year<br>300: 300% of conforming limit for filing year |
| Metric variables | LM_CNT | 5 | 2 | 1 | Number of low/moderate income loans in the handle | Positive integer |
| | LM_UPB | 185 | 15 | 8 | Balance of low/moderate income loans in the handle | Positive number |
| | US_CNT | 1 | 2 | 0 | Number of underserved-area loans in the handle | Positive integer |
| | US_UPB | 39 | 15 | 0 | Balance of underserved-area loans in the handle | Positive number |
| | SA_CNT | 2 | 0 | 0 | Number of special affordable housing loans in the handle | Positive integer |
| | SA_UPB | 78 | 0 | 0 | Balance of special affordable housing loans in the handle | Positive number |
| | COUNT | 5 | 2 | 1 | Number of loans in the handle | Positive integer |
| | LNAMT | 185 | 150 | 8000 | Balance of loans in the handle | Positive number |

FIG. 9

| PROPTYPE | (All) |
|---|---|
| LNTYPE | Conventional |
| LIMIT | Conforming |
| LNPURP | (Multiple Items) |
| ACTION | Lender-Originated |

| OCCPNCY | PURTYPE | Data | ASOFDT 1995 | 1996 | 1997 | 1998 | 1999 | 2000 | 2001 | 2002 | 2003 | 2004 | 2005 |
|---|---|---|---|---|---|---|---|---|---|---|---|---|---|
| Owner-Occupied | FN | Sum of LM_CNT | 287,084 | 292,759 | 300,777 | 685,195 | 477,935 | 369,293 | 831,686 | 1,186,126 | 1,832,912 | 844,571 | 593,535 |
| | | Sum of SA_CNT | 86,244 | 83,251 | 85,258 | 194,819 | 152,274 | 128,972 | 390,120 | 390,120 | 613,397 | 306,642 | 218,448 |
| | | Sum of COUNT | 746,100 | 787,930 | 803,883 | 1,942,329 | 1,212,255 | 1,212,255 | 2,890,164 | 2,890,164 | 4,529,925 | 1,869,242 | 1,365,461 |
| | FR | Sum of LM_CNT | 151,322 | 227,588 | 214,804 | 515,192 | 398,829 | 252,273 | 622,779 | 800,750 | 922,829 | 477,813 | 372,004 |
| | | Sum of SA_CNT | 43,272 | 62,512 | 58,380 | 141,999 | 128,338 | 85,182 | 194,373 | 260,257 | 292,382 | 162,331 | 125,737 |
| | | Sum of COUNT | 432,428 | 629,803 | 588,547 | 1,465,283 | 973,552 | 595,871 | 1,639,101 | 2,093,492 | 2,749,651 | 1,222,293 | 957,644 |
| | OT | Sum of LM_CNT | 348,456 | 445,586 | 588,591 | 982,514 | 945,405 | 768,396 | 1,019,912 | 1,342,300 | 2,086,103 | 2,155,680 | 2,462,216 |
| | | Sum of SA_CNT | 140,501 | 178,142 | 243,490 | 397,128 | 406,307 | 323,669 | 381,561 | 487,611 | 746,054 | 781,446 | 887,908 |
| | | Sum of COUNT | 774,751 | 1,000,963 | 1,292,196 | 2,197,836 | 1,931,012 | 1,588,375 | 2,374,345 | 3,113,246 | 4,831,631 | 4,477,585 | 5,577,223 |
| | RT | Sum of LM_CNT | 616,220 | 833,505 | 845,597 | 1,125,325 | 1,166,942 | 976,859 | 1,442,140 | 1,509,990 | 1,730,078 | 1,378,158 | 1,260,244 |
| | | Sum of SA_CNT | 249,808 | 319,125 | 333,725 | 421,050 | 415,480 | 415,480 | 548,665 | 565,286 | 653,981 | 543,315 | 488,872 |
| | | Sum of COUNT | 1,481,711 | 2,016,628 | 1,943,218 | 2,729,102 | 2,099,136 | 2,099,136 | 3,445,738 | 3,628,210 | 4,094,134 | 2,901,801 | 2,900,515 |
| Owner-Occupied Sum of LM_CNT | | | 1,403,082 | 1,799,438 | 1,949,769 | 3,308,226 | 2,989,111 | 2,366,821 | 3,916,517 | 4,839,166 | 6,571,922 | 4,856,222 | 4,687,999 |
| Owner-Occupied Sum of SA_CNT | | | 519,825 | 643,030 | 720,853 | 1,154,996 | 1,168,806 | 953,303 | 1,392,921 | 1,703,274 | 2,305,814 | 1,793,734 | 1,720,965 |
| Owner-Occupied Sum of COUNT | | | 3,434,990 | 4,435,324 | 4,627,844 | 8,334,550 | 6,681,156 | 5,141,673 | 9,543,736 | 11,725,112 | 16,205,341 | 10,470,921 | 10,800,843 |
| Not-Owner-Occupied | FN | Sum of LM_CNT | 7,250 | 8,046 | 9,045 | 20,100 | 18,119 | 18,521 | 35,549 | 59,516 | 81,798 | 42,425 | 30,981 |
| | | Sum of SA_CNT | 2,437 | 2,679 | 2,870 | 6,518 | 6,225 | 7,033 | 12,282 | 20,395 | 26,713 | 13,647 | 9,972 |
| | | Sum of COUNT | 36,195 | 38,291 | 45,826 | 103,173 | 81,762 | 79,282 | 166,868 | 276,455 | 407,018 | 225,233 | 203,514 |
| | FR | Sum of LM_CNT | 4,167 | 6,223 | 6,405 | 12,244 | 16,071 | 12,376 | 22,295 | 28,223 | 26,974 | 19,446 | 13,757 |
| | | Sum of SA_CNT | 1,406 | 1,990 | 1,971 | 3,886 | 5,432 | 4,110 | 7,225 | 9,417 | 8,352 | 5,881 | 4,101 |
| | | Sum of COUNT | 21,802 | 31,216 | 33,855 | 68,448 | 75,527 | 62,757 | 118,745 | 148,890 | 151,474 | 118,785 | 102,233 |
| | OT | Sum of LM_CNT | 21,669 | 15,732 | 27,816 | 39,251 | 39,264 | 31,809 | 45,401 | 55,551 | 91,462 | 103,799 | 111,692 |
| | | Sum of SA_CNT | 9,814 | 6,347 | 11,777 | 16,912 | 17,195 | 13,533 | 17,526 | 21,435 | 33,658 | 37,507 | 40,502 |
| | | Sum of COUNT | 60,205 | 67,708 | 108,063 | 160,657 | 143,947 | 123,987 | 188,858 | 251,126 | 428,472 | 527,478 | 797,413 |
| | RT | Sum of LM_CNT | 44,433 | 51,036 | 57,358 | 64,815 | 69,817 | 59,032 | 74,645 | 80,892 | 95,091 | 95,250 | 85,374 |
| | | Sum of SA_CNT | 18,065 | 19,840 | 22,675 | 25,397 | 29,008 | 24,834 | 29,708 | 31,737 | 37,212 | 37,164 | 34,198 |
| | | Sum of COUNT | 194,388 | 226,564 | 239,263 | 275,106 | 291,837 | 247,024 | 330,352 | 375,094 | 472,324 | 482,088 | 495,678 |
| Not-Owner-Occupied Sum of LM_CNT | | | 77,519 | 81,037 | 100,624 | 136,410 | 143,271 | 121,738 | 177,890 | 224,182 | 295,325 | 260,920 | 241,804 |
| Not-Owner-Occupied Sum of SA_CNT | | | 31,722 | 30,856 | 39,293 | 52,713 | 57,860 | 49,510 | 66,741 | 82,984 | 105,935 | 94,199 | 88,773 |
| Not-Owner-Occupied Sum of COUNT | | | 312,590 | 363,779 | 427,007 | 607,584 | 593,073 | 513,050 | 804,823 | 1,051,565 | 1,459,288 | 1,353,584 | 1,598,838 |

FIG. 10A

| PROPTYPE | (All) |
|---|---|
| LNTYPE | Conventional |
| LIMIT | Conforming |
| LNPURP | (Multiple Items) |
| ACTION | Lender-Originated |

| OCCPNCY | PURTYPE | Data | ASOFDT 1995 | 1996 | 1997 | 1998 | 1999 | 2000 | 2001 | 2002 | 2003 | 2004 | 2005 |
|---|---|---|---|---|---|---|---|---|---|---|---|---|---|
| Unknown Occupancy | FN | Sum of LM_CNT | 4,697 | 3,567 | 2,662 | 3,417 | 3,551 | 2,394 | 5,010 | 5,634 | 7,196 | 2,303 | 2,183 |
|  |  | Sum of SA_CNT | 1,020 | 761 | 685 | 859 | 893 | 775 | 1,581 | 1,667 | 2,377 | 815 | 851 |
|  |  | Sum of COUNT | 38,184 | 19,582 | 9,909 | 12,925 | 13,310 | 7,258 | 14,666 | 17,140 | 21,009 | 7,084 | 8,211 |
|  | FR | Sum of LM_CNT | 2,959 | 2,599 | 23,418 | 3,761 | 3,856 | 4,456 | 17,639 | 23,883 | 14,056 | 957 | 419 |
|  |  | Sum of SA_CNT | 674 | 590 | 6,242 | 923 | 1,060 | 1,356 | 5,234 | 7,840 | 4,420 | 314 | 118 |
|  |  | Sum of COUNT | 40,768 | 19,339 | 68,625 | 14,045 | 12,945 | 11,795 | 45,977 | 60,296 | 39,254 | 3,010 | 2,079 |
|  | OT | Sum of LM_CNT | 3,961 | 13,451 | 4,071 | 12,802 | 13,654 | 5,740 | 5,314 | 7,668 | 11,657 | 7,595 | 4,105 |
|  |  | Sum of SA_CNT | 1,821 | 6,144 | 1,302 | 5,202 | 5,938 | 2,198 | 1,999 | 2,596 | 3,795 | 2,845 | 1,380 |
|  |  | Sum of COUNT | 36,414 | 52,626 | 14,530 | 28,835 | 28,586 | 13,940 | 14,770 | 24,779 | 36,980 | 21,988 | 19,386 |
|  | RT | Sum of LM_CNT | 9,312 | 14,159 | 16,204 | 8,941 | 9,377 | 7,037 | 7,785 | 10,622 | 10,028 | 7,400 | 5,568 |
|  |  | Sum of SA_CNT | 2,751 | 4,153 | 5,564 | 2,817 | 3,641 | 2,750 | 2,545 | 3,720 | 3,658 | 2,649 | 2,139 |
|  |  | Sum of COUNT | 102,431 | 70,227 | 48,045 | 30,153 | 30,211 | 20,275 | 24,186 | 32,560 | 30,868 | 24,951 | 20,072 |
| Unknown Occupancy Sum of LM_CNT |  |  | 20,929 | 33,776 | 46,355 | 28,921 | 30,438 | 19,627 | 35,748 | 47,807 | 42,937 | 18,255 | 12,275 |
| Unknown Occupancy Sum of SA_CNT |  |  | 6,266 | 11,648 | 13,793 | 9,801 | 11,532 | 7,079 | 11,359 | 15,823 | 14,250 | 6,621 | 4,488 |
| Unknown Occupancy Sum of COUNT |  |  | 217,797 | 161,774 | 141,109 | 85,958 | 83,052 | 53,268 | 99,599 | 134,775 | 128,111 | 57,033 | 49,748 |
| Total Sum of LM_CNT |  |  | 1,501,530 | 1,914,251 | 2,096,748 | 3,473,557 | 3,162,820 | 2,508,186 | 4,130,155 | 5,111,155 | 6,910,184 | 5,135,397 | 4,942,078 |
| Total Sum of SA_CNT |  |  | 557,813 | 685,534 | 773,939 | 1,217,510 | 1,238,198 | 1,009,892 | 1,471,021 | 1,802,081 | 2,425,999 | 1,894,554 | 1,814,226 |
| Total Sum of COUNT |  |  | 3,965,377 | 4,960,877 | 5,195,960 | 9,028,092 | 7,357,281 | 5,707,991 | 10,448,158 | 12,911,452 | 17,792,740 | 11,881,538 | 12,449,429 |

FIG. 10B

SYSTEMS, METHODS, AND COMPUTER-READABLE STORAGE MEDIA FOR ANALYZING HMDA DATA

RELATED APPLICATIONS

This application claims the benefit of U.S. Provisional Application No. 60/907,700 filed Apr. 13, 2007, which is incorporated herein by reference in its entirety.

TECHNICAL FIELD

The present disclosure generally relates to financial data and to systems, methods, and computer-readable storage media for analyzing data, such as data related to the Home Mortgage Disclosure Act. More particularly, the disclosure relates to systems, methods, and computer-readable storage media for analyzing summary reports and public versions of such data, and extracting the original underlying data for use in further analysis and incorporation into report format.

BACKGROUND

The Home Mortgage Disclosure Act ("HMDA") was enacted by Congress in 1975 and requires certain financial institutions (e.g., lenders) to publicly disclose data about housing-related loans and applications for such loans. The publicly-disclosed data ("HMDA data") may be used to: (a) determine whether financial institutions are serving the housing needs of their communities; (b) assist in directing government officials and private investors to areas that may need investment; and (c) identify possible discriminatory lending patterns and thereby assist regulatory agencies in enforcing compliance with antidiscrimination statutes.

Since HMDA was enacted, there have been periodic changes to the HMDA data required to be disclosed by the financial institutions. For example, initially, a financial institution was only required to disclose data related to the geographic location of originated and purchased home loans. Today, HMDA data has been expanded to include data about denied home loan applications; the race, sex, and income of the applicant or borrower; and the price data for some loans. Accordingly, with some exceptions, a financial institution is required under HMDA to report the following data:

(a) the loan or application, such as the type and amount of the loan made (or applied for) and, in some circumstances, its price;

(b) the disposition of the application, such as whether it was denied or resulted in an origination of a loan;

(c) the property to which the loan relates, such as its type (single-family, multi-family, etc.) and location (including the census tract);

(d) the applicant's ethnicity, race, sex, and income; and (e) the sale of the loan, if it was sold.

In addition to the changes in the requirement of data to be disclosed by HMDA, there has also been changes to the required format of the disclosed data. An example of a change in the required format is reflected in the disclosure of the property location information, which is reported using census tract information provided by the federal government. Census tracts may vary with each census reporting year. Accordingly, because the same property location may appear in different census tracts depending upon which census data is used, it is difficult to compare HMDA data for years that use, for example, the 1990 census tracts with HMDA data for years that use the 2000 census tracts.

The number of loans and applications each year that require the public disclosure of HMDA data is in the tens of millions. Financial institutions are required to disclose HMDA data annually, in a predefined format, to the Federal Financial Institutions Examination Council ("FFIEC"). The FFIEC consolidates and summarizes the HMDA data received from the different financial institutions and subsequently releases this data annually to the public via a publicly accessible database or through distribution of the HMDA data on a storage media, such as a Digital Versatile Disk (DVD).

The version of the HMDA data released to the public is loan-level HMDA data that is depersonalized so that information relating to the borrower or property can no longer be identified. In addition, the FFIEC may also release to the public summaries of the loan-level HMDA data in order to make the large amount of loan-level HMDA data manageable and useable. For example, a summary report may be published for each mortgage lender by metropolitan statistical area ("MSA"), another summary report may be published that aggregates lender data for each MSA, and yet another summary report may be published for the entire United States. MSAs are defined by the White House Office of Management and Budget ("OMB") and comprise a list of geographic components (e.g., counties or towns) surrounding an urbanized area. An example of an MSA as defined by the OMB is the "Washington-Arlington-Alexandria, DC-VA-MD-WV Metropolitan Statistical Area."

Because HMDA reporting requirements and formats have changed over the years and because the public HMDA data is only published on an annual basis, it is difficult for an analyst to conduct an in-depth analysis of this data. In particular, it is difficult to perform any cross-year analysis of the HMDA data. Moreover, mergers may also complicate analysis of HMDA data. For example, when a financial institution acquires another financial institution, the HMDA data for years preceding the acquisition will only reflect the acquired institution's relationship to the loan. The HMDA data published by the FFIEC is not updated to reflect the acquiring institution's relationship to the loan.

Thus, direct analysis of HMDA data may take inordinate amounts of time, typically requiring computer code to be written each time a specified analysis is undertaken. No existing application or tool effectively reduces the processing requirements for working with HMDA data so that data analysis may be conducted without writing new computer code and within user-friendly time constraints.

HMDA data may also be linked to and processed with other relevant data sets such as U.S. Department of Housing and Urban Development ("HUD") data, lender data, and geographic reference data. However, no centralized processing mechanism exists that integrates HMDA data with other data sets, or allows for user-friendly visualization and processing of HMDA data and other data sets.

In addition, government-sponsored enterprises ("GSEs"), such as the Federal Home Loan Mortgage Corporation (Freddie Mac) and the Federal National Mortgage Association (Fannie Mae) may have HUD goals they are required to meet. These goals may include serving under-served area families, such as families in economically depressed areas where lenders tend to shy away from doing business. Another goal may be serving a certain percentage of low-income families, defined by having an income below a certain percentage of the average income for the area. No tool presently allows GSEs or other users to capture migrational patterns or other trends that allow the GSEs to project a business strategy that will help them achieve these HUD goals.

Systems and methods consistent with the present invention address the difficulties discussed above and allow for user-friendly processing of HMDA and other data.

SUMMARY

Consistent with the present invention, as embodied and broadly described herein, systems, methods, and computer program products are provided for normalizing and analyzing HMDA data.

According to one embodiment consistent with the invention, a computer-implemented method is provided for normalizing HMDA data. The method may comprise receiving HMDA data including at least one of HMDA data reports and loan-level public HMDA data, the HMDA data having information that varies as a function of time; correcting errors in the HMDA data; normalizing the HMDA data across any variation in the information; summarizing the normalized HMDA data; and outputting the summarized and normalized HMDA data to an application for analysis.

In another embodiment consistent with the invention, a computer-readable storage medium includes program instructions which perform, when executed by a process perform, a method of normalizing HMDA data. The method may comprise receiving HMDA data including at least one of HMDA data reports and loan-level public HMDA data, the HMDA data having information that varies as a function of time; correcting errors in the HMDA data; normalizing the HMDA data across any variation in the information; summarizing the normalized HMDA data; and outputting the summarized and normalized HMDA data to an application for analysis.

In another embodiment consistent with the invention, a HMDA data analysis tool for performing a normalizing process and analysis of HMDA data is provided. The HMDA data analysis tool may comprise a geographic translator for performing a cross-year process to normalize geographic information on the location of properties reported in the HMDA data; an income translator for performing a cross-year process to normalize HUD goals required of government-sponsored enterprises relative to HMDA data; a lender translator for performing a cross-year process to normalize lender information reported in the HMDA data; a rules repository for storing rules for performing the normalization process; and a rules processor for executing the rules.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of several further features disclosed below in the detailed description.

BRIEF DESCRIPTION OF THE DRAWINGS

The accompanying drawings, which are incorporated in and constitute a part of this specification, illustrate various features, embodiments and aspects consistent with the invention and, together with the description, explain advantages and principles of the invention. In the drawings.

FIG. 2A illustrates an exemplary loan/application register form used by a financial institution to report HMDA data, consistent with principles of the present invention;

FIG. 2B illustrates an exemplary table of codes used to complete the loan/application register form, consistent with the principles of the present invention;

FIG. 3A illustrates an exemplary summary report for the year 2006 of HMDA data for a particular financial institution within a particular MSA, consistent with the principles of the present invention;

FIG. 3B illustrates an exemplary summary report for the year 2006 of HMDA data for an aggregate of financial institutions within a particular MSA, consistent with the principles of the present invention;

FIGS. 3C and 3D illustrate an exemplary summary report for the year 2006 of the national aggregate of loans handled, consistent with the principles of the present invention;

FIG. 9 illustrates an exemplary report of summarized and normalized HMDA data, consistent with principles of the present invention; and FIGS. 10A and 10B illustrate an exemplary pivot table for analyzing the summarized and normalized HMDA data, consistent with principles of the present invention.

DESCRIPTION OF THE EMBODIMENTS

Reference will now be made in detail to various embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Figure 1:
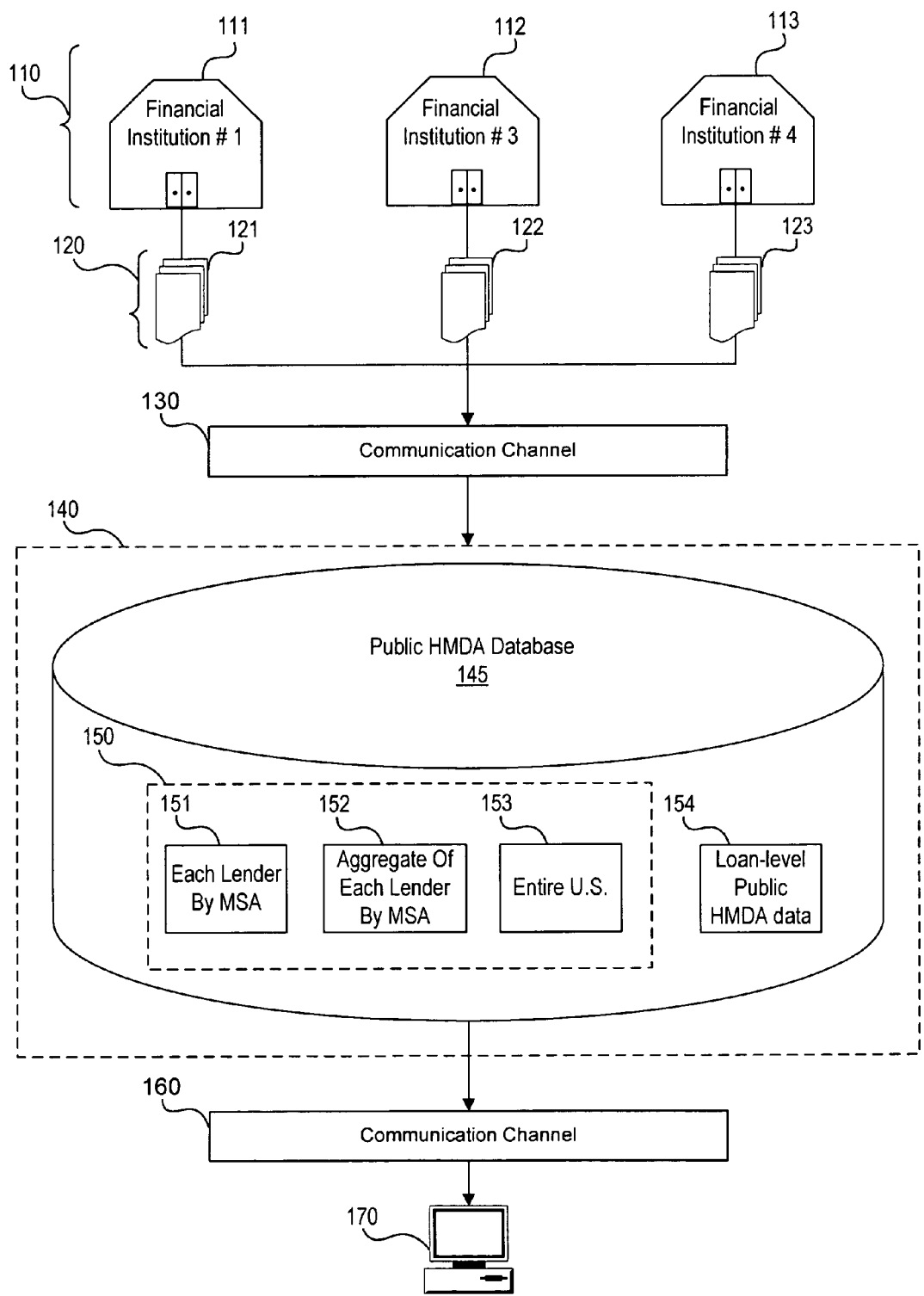
FIG. 1 is a block diagram illustrating an exemplary overview of participants in and operation of the HMDA data reporting process, consistent with the principles of the present invention.

FIG. 1 is a block diagram illustrating an exemplary high-level overview of participants in and operation of an HMDA data reporting process. As shown in FIG. 1, the participants may include financial institutions (e.g., lenders) 111, 112, and 113 (collectively referenced as 110) and the FFIEC 140. As further shown in FIG. 1, financial institutions 110 may generate and transmit private HMDA data 121, 122, and 123 (collectively referenced as 120) over a communication channel 130 to the FFIEC 140. The FFIEC 140 may collect and store the private HMDA data 120 into a publicly accessible database 145. Specifically, the public HMDA database 145 may store loan-level public HMDA data 154 that has been depersonalized so that information relating to the borrower or property may no longer be identified, as may be the case with private HMDA data 120. The FFIEC 140 may further aggregate and summarize the loan-level public HMDA data 154 and produce HMDA data summary reports 150, which are also stored in public HMDA database 145. Specifically, the HMDA data summary reports 150 may include a summary report of HMDA data for each lender by MSA 151, a summary report of an aggregate HMDA data for all lenders by MSA 152, and a summary report of an aggregate of HMDA data for the entire United States 153. The FFIEC-produced HMDA data summary reports 150 and loan-level public HMDA data 154 (collectively referred to hereinafter as "public HMDA data" or "HMDA data") may be transmitted to or accessed through a communication channel 160 by the public via, for example, a computer 170.

Communication channels 130 and 160 may include, alone or in any suitable combination, a telephony-based network, a local area network (LAN), a wide area network (WAN), a dedicated intranet, wireless LAN, the Internet, and intranet, a wireless network, a bus, or other appropriate communication mechanisms. Moreover, various combinations of wired and/or wireless components may be incorporated into communication channels 130 and 160. Furthermore, various combinations of point-to-point or network communications may also be incorporated into communication channels 130 and 160 to facilitate communication between the one or more financial institutions 110, the FFIEC 140, and one or more computers 170. Additionally, data communicated through communication channels 130 and 160 may be communicated instead through the transfer of storage media, such as DVDs.

FIG. 2A shows an example of a loan/application register ("LAR") 200 used by a financial institution 110 to report HMDA data 120 to the FFIEC 140. As shown in FIG. 2A, the LAR may contain multiple fields 210 to be completed by the financial institution 110 for loans or records 211. The multiple fields may be grouped and organized into categories, such as application or loan information 212, action taken 213, property location 214, applicant information 215, and other data 216.

Various codes may be used to complete the LAR 200. FIG. 2B contains an exemplary listing of such codes.

The information required to complete the fields 210 of the LAR 200 (FIG. 2A) does not include all the information contained in a typical loan application. Instead, the fields 210 included in the LAR 200 represent the information required from each loan application by HMDA. Moreover, information included in the LAR 200 may not be as precise or may be in a different format than the information included in a loan application. For example, LAR 200 includes information fields within the category property location 213. These information fields include the five-digit MSA number, two-digit state code, three-digit county code, and six-digit census tract number. However, on a typical loan application the property location is provided by the address of the property in house number, street, city, state, and ZIP CODE™ format. Accordingly, to transfer the address of the property provided on the loan application to the information required by the fields in the property location category 213 of the LAR 200, a process known as "geocoding" may be used. Specifically, as used herein, geocoding refers to a process of assigning geographic identifiers (e.g., MSA number and census tract) to the address of a property.

Accordingly, to report property location accurately on the LAR 200, the financial institution 110 needs current information on the MSA boundaries and the correct census tract number (currently, the 2000 census tract number). Information on the MSA boundaries are defined and reported annually by the OMB within the federal government. Census tract information may be retrieved from the U.S. Census Bureau. However, because the information on the MSA boundaries may change annually and the information on the census tract may change from census to census, the geocoding result of the same address using the same geocoding process may also change from year to year.

FIGS. 3A, 3B, and 3C-3D, show exemplary HMDA data summary reports 150 created by the FFIEC 140. Specifically, FIG. 3A shows an exemplary page of an FFIEC produced HMDA data summary report 151 for loans handled by the lender Suntrust Mortgage Inc. for the Washington-Arlington-Alexandria, DC-VA-MD-WV MSA during the year 2006. As shown in FIG. 3A, the HMDA data summary report 151 provides loan information for census tracts using the xxxx.xx format for each county within the Washington-Arlington-Alexandria, DC-VA-MD-WV MSA.

FIG. 3B shows an exemplary page of an FFIEC produced HMDA data summary report 152 for all loans handled by all lenders for the Washington-Arlington-Alexandria, DC-VA-MD-WV MSA during the year 2006. FIGS. 3C-3D show an exemplary national aggregate of loans handled during the year 2006. In this particular national aggregate, the data is grouped by characteristics of the borrower and the type of purchaser of the loans.

FIGS. 3A-3D show only a sample of loan-level public HMDA data 154 summarized by the FFIEC 140 for the particular year 2006. The FFIEC 140, however, may produce and summarize much more loan-level public HMDA data 154 in the form of different HMDA data summary reports 150 across multiple years.

Figure 4:
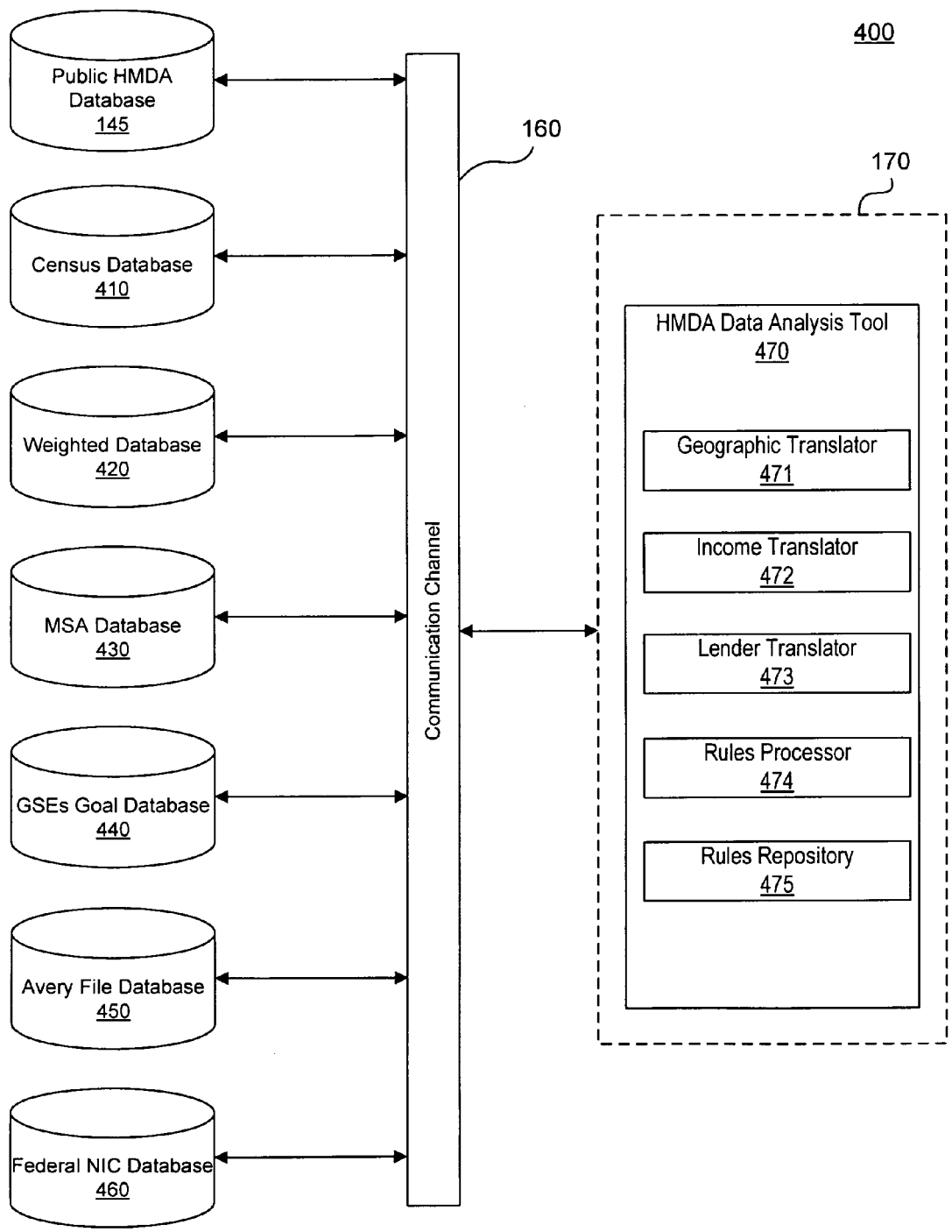
FIG. 4 illustrates an exemplary HMDA data analysis architecture, consistent with principles of the present invention.

FIG. 4 is a block diagram illustrating an exemplary HMDA data analysis system 400 in which the HMDA data analysis process may be implemented. As shown, the system 400 may include one or more sources of information 145 and 410-460, communication channel 160, and a computer 170. Computer 170 may be, for example, a properly configured desktop (minimum 200 gigabyte hard drive, 2 gigabyte RAM memory, and 1.5 GHz speed processor), such as on OptiPlex™ 330 commercially available from Dell. The computer 170 may include a HMDA data analysis tool 470, which may include a geographic translator 471, an income translator 472, a lender translator 473, a rules processor 474, and a rules repository 475.

Information sources 145 and 410-460 may include various sources of HMDA data and HMDA related data, such as the public HMDA database 145 operated by the FFIEC 140 for storing loan-level public HMDA data 154 and HMDA data summary reports 150; a census database 410 operated by the United States Census Bureau for storing national census tract data; a weighted database 420 operated through the Missouri Census Data Center Program for storing weighted data reflecting what percentage of a census tract moves in and out of a county or an MSA as the MSA definitions vary; an MSA database 430 operated by the OMB for storing the definitions of the MSAs; a GSEs goal database 440 operated by HUD for storing the goals required of mortgage finance GSEs; the Avery File database 450 operated by a Federal Reserve analyst by the name of Robert Avery for storing data indicative of what HMDA data 120 belongs to what lender for a specific HMDA year; and a Federal National Information Center (NIC) database 460 for storing data about financial institutions for which the Federal Reserve has supervisory, regulatory, or research interest in.

The geographic translator 471 may perform a cross-year process to normalize geographic information on the location of properties reported in the HMDA data. As used herein, the term "normalize" generally refers to transforming HMDA data so that individual records 211 may be compared against each other. For example, normalizing the HMDA data may include re-coding old census reference information associated with a record 211 to new census tract reference information. The geographic translator 471, income translator 472, and lender translator 473 each perform specific types of normalization of the HMDA data 120. Examples of the specific types of normalization performed are discussed in further detail below in conjunction with a description of the operation of each of the translators.

Figure 5:
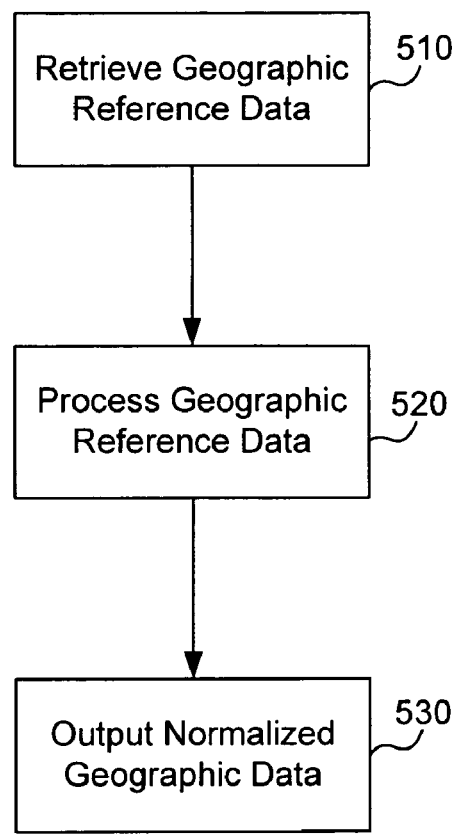
FIG. 5 illustrates an exemplary flowchart of the operation of a geographic translator, consistent with principles of the present invention.

The geographic translator 471 may normalize HMDA data 120 by transforming similar data from various years into a consistent format by taking into account changes in HMDA reporting standards and formatting of the data, data definitions, and the time period when the change occurred. Exemplary operation of the geographic translator 471 is outlined in the flowchart of FIG. 5. In step 510, the geographic translator 471 may retrieve geographic reference data. Geographic reference data may comprise the geographic information of the properties reported using the census tract information available at the time the private HMDA data 120 was reported. This geographic information may be retrieved from the public HMDA database 145. The geographic reference data may also comprise information from the census database 410, information from the weighted database 420, information from the MSA database 430, and information from the GSEs goals database 440.

In step 520, the geographic translator 471 may use rules stored in rules repository 475 and rules processor 474 to process the geographic reference data. For example, information from the census database 410 may be used to normalize current census tract data to previous census tract data and vice-versa. Information from the census database 410 may also be used to normalize current and previous census tract data to counties. In addition, information from the weighted database 420 may be used in conjunction with information from census database 410 to determine how census tracts have changed from census to census. The information needed to normalize county information to MSA data may be retrieved from the MSA database 430.

Applying rules from the rules repository 475 to the information from these three databases, the geographic translator 471 is capable of providing a reasonable normalization of a census tract to an MSA (step 530). Rules may be developed using commercially available software products that enable the development of programs or modules that may be used for managing, mining, analyzing, and reporting of data. An example of such a software product is SAS System, commercially available from the SAS Institute, Inc., hereinafter referred to as "SAS.".

An example of a rule stored within the rules repository 475 and processed by rules processor 474 during the geographic translator process 500 is a rule that normalizes the asynchronous process of changes in MSA definitions promulgated by the OMB and the acceptance of these definitions by HUD. For example, MSA definitions are issued by the OMB in approximately June of each year.

However, HUD does not incorporate the new MSA definitions into the process of defining HUD GSE goals until the following year. As a result, if, for example, in November the OMB issues a subsequent modification to the MSA definitions promulgated in June, it is too late for HUD to incorporate these modifications into its HUD GSE goals for the following year. To correct for such a discrepancy, the geographic translator 471 may use a rule that factors in the asynchronous process of changes in MSA definitions promulgated by the OMB and the acceptance of these definitions by the OMB to thereby synchronize the process by normalizing the HMDA data 120 based on the HUD reporting of the GSE goals.

An example of the above described rule developed in SAS and that may be used by the geographic translator 471 to normalize HMDA data is illustrated below.

```
*****************************************************************
******** First step: Data preparation for geo-matching;
********
*****************************************************************
* Extract geographic information from HMDA;

proc sql;
   create table hmdageo as
   select distinct asofdt, fipcode, state, county, censusno,
msaprop
   from hmda.hmda90 msa;

quit;

run;

* Transform and enhance census tract information to make it
compatible w/HUD list data hmda.hmdageo(drop=leftext rightext punto lendiff);
   set hmdageo;
   length TRACT $7;
   length LEFTEXT $4;
   length RIGHTEXT $2;
   * Replace characters O and Z with number 0;
   TRACT=translate(censusno, '00','OZ');
   punto=indexc(TRACT, '.');
   if punto=0 then do;
   TRACT=translate(TRACT, '..', '-/');
   punto=indexc(TRACT, '.');
   end;
   * Extract text left and right of the dot;
   if punto=0 then do;
   leftext=substr(TRACT, 1, min(4, length(TRACT)));
   lendiff=length(TRACT)-length(leftext);
   if lendiff>0 then rightext=
substr(TRACT,length(leftext)+1, lendiff);
   end;
   if punto>1 and punto <=5 then do;
   leftext=substr(TRACT, 1, min(punto-1,4));
   lendiff=length(TRACT)-1-length(leftext);
   if lendiff>0 then rightext=
substr(TRACT,length(leftext)+2,lendiff);
   end;
   * Replace any remaining character with number 0;
   leftext=translate(upcase(leftext),
   '0000000000000000000000000000000000000000000000000000',
   'QWERTYUIOPASDFGHJKLZXCVBNM< >?,.\|/:;{ }[
]( )*&^%$-_=+#@!'§');
   rightext=translate(upcase(rightext),
   '0000000000000000000000000000000000000000000000000000',
   'QWERTYUIOPASDFGHJKLZXCVBNM< >?,.\|/:;{ }[
]( )*&^%$-_=+#@!'§');
   *Rebuild enhanced tract without dot;
   TRACT=leftext||rightext;

run;

*****************************************************************
******** Second step: Data extraction for geo-matching;
********
*****************************************************************
* Macro to extract geo data by year and type (uni, multi) using
ref table-lookup;

% macro yearlyextract(type);
   % do year=&begyear % to &endyear;
```

```
proc sql;
    create table &type.geo&year as
    select distinct hmdageo.*
    from hmda.hmdageo, hmda.&type.cty90
    where asofdt=&year and fipcode=&type.cty90.state and
county=
cnty&year;
    quit;
    % end;
% mend yearlyextract;

* Macro to consolidate geo data by year and type (uni, multi);
% macro names(type);
    % do year=&begyear % to &endyear;
    &type.geo&year
    % end;
    % mend names;

* Define timeframe;
% let begyear=1990;
% let endyear=2003;

* Extract and merge reference-matched unicounties from HMDAGEO;
% let type=uni;
% yearlyextract(&type);
data hmda.&type.geo9003;
    set % names(&type);
run;

* Extract and merge reference-matched multicounties from HMDAGEO;
% let type=multi;
% yearlyextract(&type);
data hmda.&type.geo9003;
    set % names(&type);
run;

* Get NonGeo (not reference-matched counties) by subtracting from HMDAGEO
the union of unigeo and multigeo;
    proc sql;
    create table hmda.nongeo9003 as
    select distinct * from hmda.hmdageo
    except
    select distinct *
    from (select distinct * from hmda.unigeo9003
    union
    select distinct * from hmda.multigeo9003);
quit;
    run;
```

The income translator 472 (FIG. 4) relates to the HUD goals required of mortgage finance GSEs, such as Freddie Mac and Fannie Mae. For example, one HUD GSE goal includes a requirement that a certain percentage of loans purchased (guaranteed or held) by the GSEs are loans provided to low or moderate-income families. This HUD GSE goal is hereinafter referred to as the "L/MI goal." Another HUD GSE goal, referred to as the Special Affordable Housing Goal, requires that a certain proportion of GSE purchased loans, must be loans that are used to finance housing meeting the then-existing unaddressed needs of, and affordable to, low-income families in low-income areas and very-low-income families. This HUD GSE goal is hereinafter referred to as the "SA goal." Yet another HUD GSE goal includes a requirement that the GSEs annually purchase a specified amount or percentage of loans used to finance homes in underserved areas, such as central cities and rural areas. This HUD GSE goal is hereinafter referred to as the "underserved goal."

The specific requirements of the HUD GSE goals are defined annually. For example, in 2004 in order to determine whether a loan qualified to count towards the L/MI and/or SA goal, HUD provided a GSE goals data file, which included numerous requirements. For example, the HUD GSE goals data file incorporated the census tract boundaries and tract numbering system used in the 2000 census as well as the MSA designations established by the OMB in June 2003; based the data values in the file determining low-income areas in 2002 on 1990 census data and pre-2003 MSA definitions; provided estimates of area median incomes (MIyyyy) for 1984 through 2002 which were benchmarked to the 1990 census and area median incomes for 2003 and 2004 benchmarked to the 2000 census; and classified census tracts as metropolitan or non-metropolitan based on the OMB's specification of MSAs prior to June 2003.

The specific requirements for the underserved goal in 2004 included a definition of a "central city" as a census tract with median income at or below 120 percent of the median income of the MSA and a minority population of 30 or greater; or a census tract with median income at or below 90 percent of median income of the MSA. The 2004 requirement defined "rural areas" as a county having a median income at or below 120 percent of the greater of the state non-metropolitan median income or the nationwide non-metropolitan median income and a minority population of 30 percent or greater; or median income at or below 95 percent of the greater of the state non-metropolitan median income or nationwide non-metropolitan median income.

As is evidenced by the above 2004 requirements for the L/MI and SA goal and the underserved goal, HUD GSE goals may vary across census tracts and, in addition, may vary from year to year. Accordingly, the income translator 472 may perform a cross-year normalization of the HMDA data 120 by factoring in the changes to the HUD GSE goals.

Figure 6:
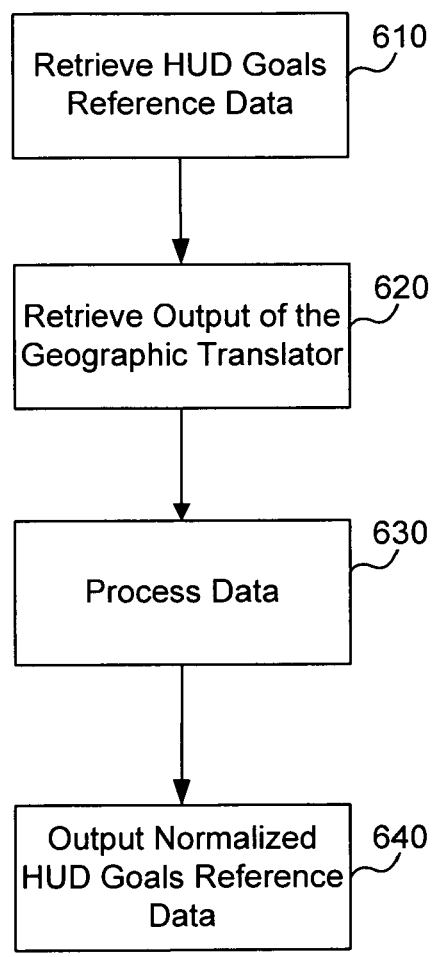
FIG. 6 illustrates an exemplary flowchart of the operation of a income translator, consistent with principles of the present invention.

Operation of the income translator 472 is outlined in the flowchart of FIG. 6. In step 610, the income translator 472 may retrieve the HUD goals reference data. HUD goals reference data may comprise HUD GSE goals reference data files retrieved from the GSEs goal database 440 and HMDA data summary reports 150 and loan-level public HMDA data 154 retrieved from the public HMDA database 145. In addition, in step 620, the income translator 472 may retrieve the output of the geographic translator 471, the normalization of census tracts to MSAs.

In step 630, the income translator 472 may use rules stored in rules repository 475 and rules processor 474 to process the HUD goals reference data and the normalized census tracts to MSA data. In order to comply with requirements set forth in the HUD GSE goals, the income translator 472 may use rules to analyze a census tract to determine whether the census tract is part of an MSA or not (step 630). For example, a determination may be made as to what part of the census tract will be considered metropolitan and what part of the census tract will be considered non-metropolitan. Based on the determination, additional rules may be applied in accordance with the requirements set forth in the HUD GSE goals data file for a particular year, such as those outlined for year 2004 discussed above (step 630). As a result of the application of these rules, the income translator 472 may determine which loans within a particular census tract meet the HUD GSE goals of L/MI and/or SA.

Further, through geocoding of the census tract, the income translator 472 may also determine which loans in the census tract meet the HUD GSE goals of underserved by incorporating a HUD-provided list of underserved census tracts.

Once a determination is made, the income translator 472 may flag the L/MI, SA, and underserved loans. In addition, by applying the rules in accordance with the requirements set forth in the HUD GSE goals data file for a particular year to the normalized census tracts to MSAs data, the income translator 472 may determine how much of a median family income has moved into and out of an MSA. Another rule may be applied in instances when an HMDA record is missing its tract number. In this instance, a rule may specify that the lowest greater than zero median income for a tract within a county is used as the median income for HUD classification purposes for that record. This allows records without tract numbers, which would otherwise be ignored, to be identified as eligible to be used in the evaluation of HUD GSE goals.

An example of a rule developed in SAS and that may be used by the income translator 472 to normalize HMDA data is illustrated below.

```
* Macro to parse goals-lookup datasets by year;

% macro geogoals;

% do year=1996% to 2002;

proc sql;
    create table geogoals&year as
    select distinct MSA2005, ST2005, CNTY2005, TRACT, CENINC, MEDINC, SERVED&year as UNDRSRVD, MI&year as AMI
        from    hmda.geogoals9602(rename=(STATE=ST2005 CNTY2002=CNTY2005    MSA2002=MSA2005 CENINC89=CENINC MEDINC89=MEDINC));
quit;

run;

% end;

proc sql;
    create table geogoals2003 as
    select distinct MSA2005, ST2005, CNTY2005, TRACT, CENINC, MEDINC, SERVED2003 as UNDRSRVD, MI2003 as AMI
        from    hmda.geogoals0305(rename=(STATE=ST2005 MSA2003=MSA2005    CENINC2003=CENINC MEDINC2003=MEDINC));
    create table geogoals2004 as
    select distinct ST2005, CNTY2005, TRACT, CENINC, MEDINC, SERVED2004 as UNDRSRVD, MI2004 as AMI
        from    hmda.geogoals0305(rename=(STATE=ST2005 CENINC2004=CENINC MEDINC2004=MEDINC));
quit;

run;

% mend;

% geogoals;

* Macro to flag goal-qualifying HMDA data; * Problem area;

% macro geogoaling;

% do year=1996% to 2003;

proc sort data=forgoals&year;
    by MSA2005 ST2005 CNTY2005 TRACT;
run;
proc sort data=geogoals&year;
    by MSA2005 ST2005 CNTY2005 TRACT;
run;

data geogoaled&year(drop=CENINC MEDINC);
    merge forgoals&year(in =a)
    geogoals&year;
    by MSA2005 ST2005 CNTY2005 TRACT;
    if a;
    * Low- and Moderate-Income Goal;
    if AMI>0 then do;
    if APPLINCM>0 then do;
    INCMRATIO=ceil(APPLINCM*10/ceil(AMI/1000))/10;
    if INCMRATIO<=0.6 then LOWMOD='1'; * Goal Qualifying Very Low Income Level;
    else if INCMRATIO<=0.8 then LOWMOD='2'; * Goal Qualifying Low Income Level;
    else if INCMRATIO<=1 then LOWMOD='3'; * Goal Qualifying Moderate Income Level;
    else if INCMRATIO<=1.2 then LOWMOD='4'; * Not Goal Qualifying High Income Level;
    else LOWMOD='5'; * Not Goal Qualifying Ultra High Income Level;
    end;
    else LOWMOD='9';*Unknown Income Level;
    end;
    else LOWMOD='9';*Unknown Income Level;
    * Special Affordable Goal;
    if MEDINC>0 then TRACTRATIO=CENINC/MEDINC;
* Determining tract ratio;
    else if ST2005<'56' then TRACTRATIO=1; * Low-Income Area cannot be determined;
    else TRACTRATIO=0; * By definition, territories are Low-Income Areas;
    if AMI>0 then do;
    if APPLINCM>0 then do;
    if INCMRATIO<=0.6 or
        (INCMRATIO<=0.8 and TRACTRATIO<=0.8)
    then SPECIAL='1';
    else SPECIAL='0';
    end;
    else SPECIAL='9';
    end;
    else SPECIAL='9';
    drop TRACTRATIO;
run;

% end;

% let year=2004;

proc sort data=forgoals&year;
    by ST2005 CNTY2005 TRACT;
run;

proc sort data=geogoals&year;
    by ST2005 CNTY2005 TRACT;
run;

data geogoaled&year(drop=CENINC MEDINC);
    merge forgoals&year(in=a)
    geogoals&year;
    by ST2005 CNTY2005 TRACT;
    if a;
    * Low- and Moderate-Income Goal;
```

```
  if AMI>0 then do;
  if APPLINCM>0 then do;
  INCMRATIO=ceil(APPLINCM*10/ceil(AMI/1000))/10;
  if INCMRATIO<=0.6 then LOWMOD='1'; * Goal Quali-
    fying Very Low Income Level;
  else if INCMRATIO<=0.8 then LOWMOD='2'; * Goal
    Qualifying Low Income Level;
  else if INCMRATIO<=1 then LOWMOD='3'; * Goal
    Qualifying Moderate Income Level;
  else if INCMRATIO<=1.2 then LOWMOD='4'; * Not
    Goal Qualifying High Income Level;
  else LOWMOD='5'; * Not Goal Qualifying Ultra High
    Income Level;
  end;
  else LOWMOD='9'; * Unknown Income Level;
  end;
  else LOWMOD='9'; * Unknown Income Level;
  * Special Affordable Goal;
  if MEDINC>0 then TRACTRATIO=CENINC/MEDINC;
* Determining tract ratio;
  else if ST2005<'56' then TRACTRATIO=1; * Low-In-
come Area cannot be determined;
  else TRACTRATIO=0; * By definition, territories are
Low-Income Areas; run;
  if AMI>0 then do;
  if APPLINCM>0 then do;
  if INCMRATIO<=0.6 or
    (INCMRATIO<=0.8 and TRACTRATIO<=0.8)
    then SPECIAL='1';
  else SPECIAL='0';
  end;
  else SPECIAL='9';
  end;
  else SPECIAL='9';
  drop TRACTRATIO;

run;

% mend;

% geogoaling;
```

In step 640, the income translator 472 outputs normalized HUD goals reference data, which include the flags for L/MI, SA, and underserved loans. The output may be in the form of a reference or lookup table, which may further include census tracts by year, with area median income data and underserved area flags, as provided by HUD to the GSEs.

Figure 7:
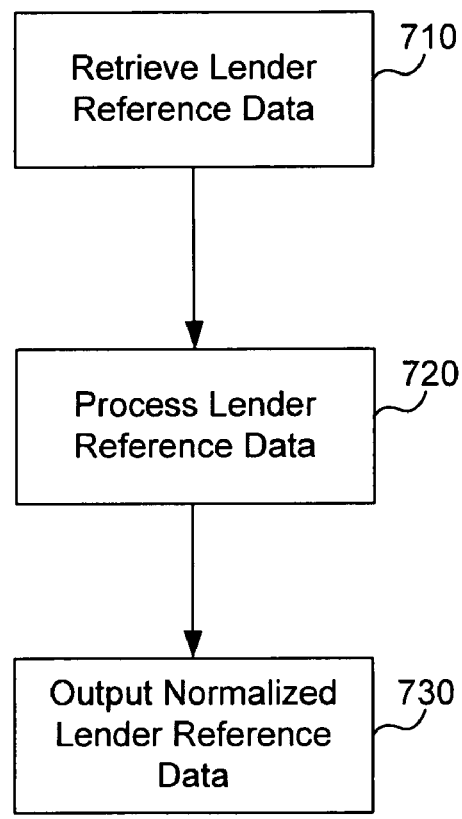
FIG. 7 illustrates an exemplary flowchart of the operation of a lender translator, consistent with principles of the present invention.

The lender translator 473 may perform a cross-year process to normalize lender information in the HMDA data summary reports 150 and loan-level public HMDA data 154. Operation of the lender translator 473 is outlined in the flowchart of FIG. 7. In step 710, the lender translator 473 may retrieve lender reference data. Lender reference data may comprise HMDA data summary reports 150 and loan-level public HMDA data 154 retrieved from the pubic HMDA database 145, Avery files retrieved from the Avery file database 450, and data from the Federal NIC database 460. Examples of the data retrieved from the Federal NIC database 460 may include bank names and associated identifying tags that allow the determination of what entity is the child of a parent bank. This data may be used, for example, to normalize the lenders to one standard set of names and thereby reduce the thousands of lender names that may exist in the HMDA data.

The Avery files may include rules for normalizing lender information associated with the HMDA data which fail to include the reporting of master financial institutions for lenders. For example, a financial institution 110 may include multiple entities that report private HMDA data 120. In part, financial institutions 110 report private HMDA data 120 out of multiple entities in an attempt to prevent other competitive financial institutions 110 from determining the lending patterns and lending amounts of the master financial institutions. Accordingly, when reviewing HMDA data summary reports 150 and loan-level public HMDA data 154, it may be difficult to determine all the loans that belong to a particular financial institution 110.

However, the Avery files may include a data set of lenders for each year, and therefore, it may be used to determine attribute metrics, like market share, for a particular lender in a given year by considering all of the loans for that lender. In step 720, the rules from the Avery files may be used to process the HMDA data to thereby identify what loans belong to a particular financial institution.

An example of a rule developed in SAS and that may be used by the lender translator 473 to normalize HMDA data is illustrated below.

```
My Averoll 1.sas libname hmda 'e:\hmda';

options nosymbolgen;

% let begyear=1990;

% let endyear=2004;

* Macro to define desired variable attributes;

% macro Attribit;
  % do year=&begyear % to &endyear;
  % let yy=% substr(&year,3,2);
    ENTTY&yy length=$10.
    ENTFT&yy length=$10.
    NAME&yy length=$30.
    FDIC&yy length=$10.
    OCC&yy length=$10.
    THRIFT&yy length=$10.
    NCUA&yy length=$10.
    ORG&yy length=8.
    NAMEOR&yy length=$30.
    ORGFUT&yy length=8.
  % end;

% mend;

* Macro to define variables to keep;

% macro Keepit;
  % do year=&begyear % to &endyear;
  % let yy=% substr(&year,3,2);
    ENTITY&yy  ENTFUT&yy  NAMES&yy  CERT&yy
    OCC&yy     THRIFT&yy  NCUA&yy   ORG&yy
    NAMEOR&yy ORGFUT&yy
  % end;

% mend;

* Macro to define variables to be renamed;

% macro Renameit;
  % do year=&begyear % to &endyear;
  % let yy=% substr(&year,3,2);
    NAMES&yy=NAME&yy        CERT&yy=REG1&yy
    OCC&yy=REG2&yy          THRIFT&yy=REG3&yy
    NCUA&yy=REG4&yy
  % end;

% mend;

* Macro to define variables to be dropped;
```

```
% macro Dropit;
    % do year=&begyear % to &endyear;
    % let yy=% substr(&year,3,2);
    ENTITY&yy  ENTFUT&yy  REG1&yy  REG2&yy
REG3&yy REG4&yy
    % end;
% mend;

* Macro to define variables to be transformed;

% macro Transformit;
    % do year=&begyear % to &endyear;
    % let yy=% substr(&year,3,2);
    if ENTITY&yy then ENTTY&yy=repeat('0',9-length
(compress(put(ENTITY&yy,8.))))       ||compress(put
(ENTITY&yy,8.));
        else ENTTY&yy=' ';
    if ENTFUT&yy then ENTFT&yy=repeat('0',9-length
(compress(put(ENTFUT&yy,8.))))       ||compress(put
(ENTFUT&yy,8.));
        else ENTFT&yy=' ';
    if REG1&yy then FDIC&yy=repeat('0',9-length(com-
press(put(REG1&yy,8.)))) ||compress(put(REG1&yy,8.));
        else FDIC&yy=' ';
    if REG2&yy then OCC&yy=repeat('0',9-length(com-
press(put(REG2&yy,8.)))) ||compress(put(REG2&yy,8.));
        else OCC&yy=' ';
    if REG3&yy then THRIFT&yy=repeat('0',9-length(com-
press(put(REG3&yy,8.)))) ||compress(put(REG3&yy,8.));
        else THRIFT&yy=' ';
    if REG4&yy then NCUA&yy=repeat('0',9-length(com-
press(put(REG4&yy,8.))))    ||compress(put(REG4&yy,8.));
else NCUA&yy=' ';
    % end;
% mend;

% let yy=% substr(&endyear,3,2);

* Data step to customize Avery&yy;

data hmda.avery (drop=CODE HMPRID % Dropit);
    attrib AGENCY length=$1. RESPID length=$10. %
Attribit;
    set hmda.avery&yy (keep=CODE HMPRID % Keepit
rename=(% Renameit));
    AGENCY=put(CODE,1.);
    RESPID=HMPRID;
    % Transformit;
run;

% let fromdata=hmda.avery;

% let newdata=avex;

* Macro to de-matrix Avery;

% macro DeAvery;
    % do year=&begyear % to &endyear;
    % let yy=% substr(&year,3,2);
    data &newdata&year (keep=ASOFDT AGENCY
RESPID ENTTY NAME FDIC OCC THRIFT NCUA ORG
NAMEOR ORGFUT);
    length ASOFDT 4;
    length AGENCY $ 1;
    length RESPID $ 10;
    length ENTTY $ 10;
    length NAME $ 30;
    length FDIC $ 10;
    length OCC $ 10;
    length THRIFT $ 10;
    length NCUA $ 10;
    length ORG 8;
    length NAMEOR $ 30;
    length ORGFUT 8;
    set &fromdata; if ENTTY&yy;
    ASOFDT=&year;
    ENTTY=ENTTY&yy;
    NAME=NAME&yy;
    FDIC=FDIC&yy;
    OCC=OCC&yy;
    THRIFT=THRIFT&yy;
    NCUA=NCUA&yy;
    ORG=ORG&yy;
    NAMEOR=NAMEOR&yy;
    ORGFUT=ORGFUT&yy;
    run;
    % end;
% mend;

% DeAvery;
```

In step 730, the lender translator 473 may output normalized lender reference data. The output may be in the form of a table of market shares for lenders by year. For example, a market share for financial institution 1 in 2006 may also include the market share of financial institution 2. Thus, the table may be used to determine the historical data of financial institution 1 as if it had owned financial institution 2 in 2006.

Figure 8:
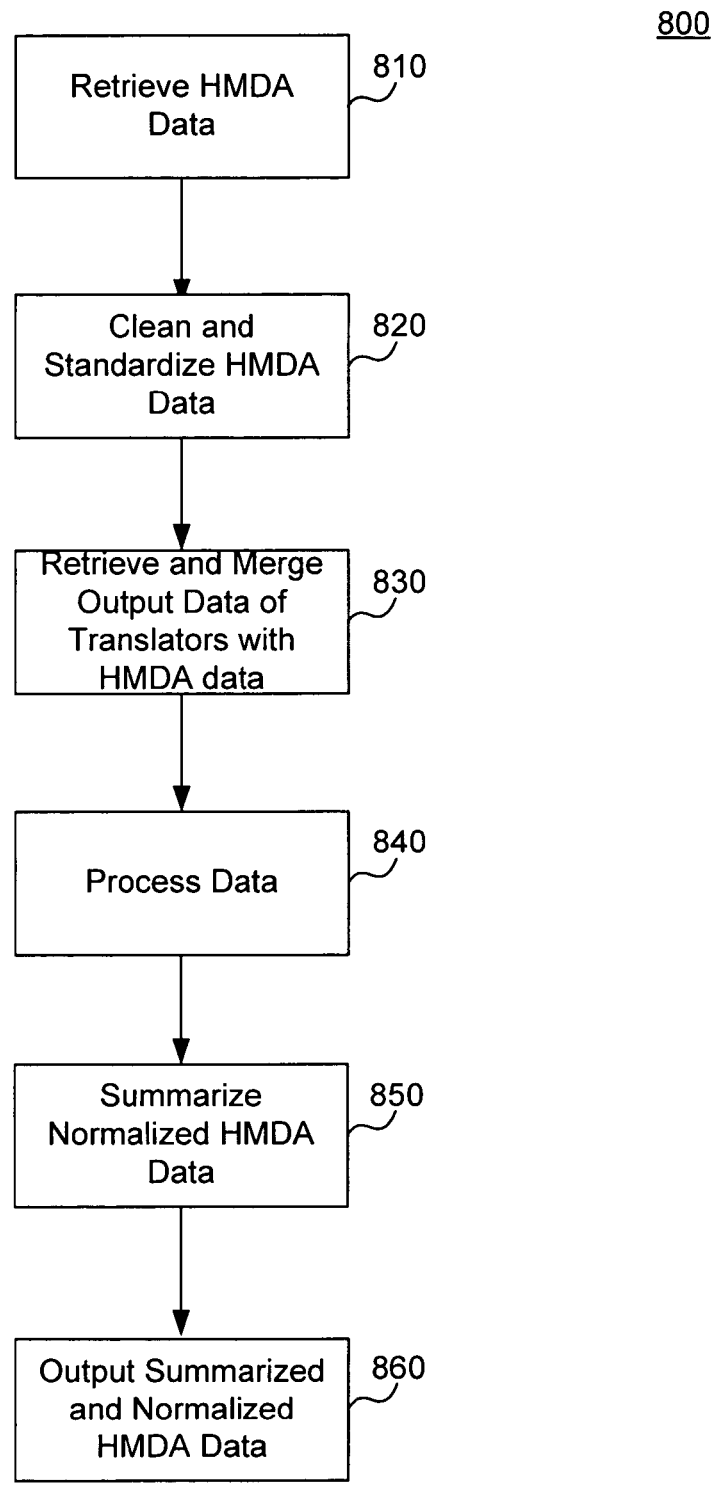
FIG. 8 illustrates an exemplary flowchart of the operation of a HMDA data analysis tool, consistent with principles of the present invention.

Operation of the HMDA data analysis tool 470 is outlined in the flowchart of FIG. 8. In the HMDA data analysis process 800, the HMDA data analysis tool 470 may normalize HMDA data by incorporating the outputs of geographic translator 471, income translator 472, and lender translator 473.

In step 810, the HMDA data analysis tool 170 may retrieve HMDA data summary reports 150 and loan-level public HMDA data 154 from the public HMDA database 145. The retrieved HMDA data may be HMDA data that has been reported across a number of different years.

In step 820, the HMDA data analysis tool 470 may perform a process of cleaning and standardizing the HMDA data to correct for errors caused by, for example, improper data entry and/or inconsistent formatting of the entered data. Other errors in the HMDA data may be caused by a lender consistently misusing the codes used to complete the LAR 200. To correct this error, the HMDA data analysis tool 470 may clean the HMDA data by replacing the misused code with the correct code. Additionally, a branch of a lender may consistently report only a part of a census tract number, such as 1234.xx. To correct such an error, the HMDA data analysis tool 470 may convert the incomplete census tract to the tract number for the branch, so 1234.xx could be converted to 1234.56 if "56" is the suffix for properties serviced by that branch.

Another error in the HMDA data may occur when a lender may have reported their data using a first code for a given area, and other lenders may have reported data for the same area using a different, outdated code. The HMDA data analysis tool 470 may correct this error by standardizing the HMDA data to account for the differences in lender reporting. For example, if 10 lenders use code "25" for a particular area, and 5 lenders use code "86," the HMDA data 120 may be standardized by converting code "86" to code "25."

In addition, census county codes may have changed over the years. For example, code "25" for Dade County from the 1990 census may have changed to code "86" for Miami-Dade county for the 2000 census. Thus, within a particular HMDA record, the same property may have different reference codes.

The data may be standardized to a particular census year by using either code "25" or "86" for all such records.

An example of a rule developed in SAS and that may be used to clean and standardize the HMDA data is illustrated below.

```
% unixrsub(consas);

rsubmit;

libname myhmda '/export/fmacdata/dev/frd/userdata/go-mez/V8';

options errors=1 invaliddata='.';

/*Fixing FIPS up*/
data myhmda.app190__97fips(drop=fipsnumber);
    set myhmda.app190__97;

/* Cleaning up variable STATE */
    if state='AK' then fipcode='02';
    else if state='AL' then fipcode='01';
    else if state='AR' then fipcode='05';
    else if state='AZ' then fipcode='04';
    else if state='CA' then fipcode='06';
    else if state='CO' then fipcode='08';
    else if state='CT' then fipcode='09';
    else if state='RQ' then state='PR';
    else if state='AQ' then state='AS';
    else if state='GQ' then state='GU';
    else if state='SQ' then state='UM';
    else if state='VQ' then state='VI';
    else if fipcode='64' then state='FM';
    else if fipcode='68' then state='MH';
    else if fipcode='69' then state='MP';
    else if fipcode='70' then state='PW';
    else if trim(state)=' ' then state='--';

/* Cleaning up variable FIPCODE */
    if fipcode=state then do;
    fipsnumber=stfips(state);
    if fipsnumber>=1 and fipsnumber<=9 then
        fipcode='0'||put(fipsnumber,1.);
    else if fipsnumber>=10 and fipsnumber<=95 then
        fipcode=put(fipsnumber,2.);
    else fipcode='.';
    end;
    else do;
    fipsnumber=stfips(fipstate(input(fipcode,2.)));
    /*_error__0;*/
    if fipsnumber>=1 and fipsnumber<=9 then
        fipcode='0'||put(fipsnumber,1.);
    else if fipsnumber>=10 and fipsnumber<=95 then
        fipcode=put(fipsnumber,2.);
    else fipcode='.';
    end;

run;
```

Once the HMDA data has been cleaned and standardized, the HMDA data analysis tool 470 may perform a multiple match-merge step with auxiliary data from processes 500, 600, and 700 in order to normalize the HMDA data to correct for changes in the data (step 830). For example, as discussed above, depending on the variation in the reporting years of the HMDA data, the HMDA data may vary based on requirement and format changes that may have occurred during that time period. In addition, depending on the time period spanned by the received HMDA data, different mergers and acquisitions may have occurred among the lenders and, thereby, the HMDA data for years preceding the merger or acquisition will only reflect the acquired institution's relationship to the loan. Another variation in the HMDA data received may be caused by use of different census tract information. For example, some of the received HMDA data may have been reported using the 1990 census tract information while some of the received HMDA data may been reported using the 2006 census tract information.

In step 840, additional rules, that may normalize attributes of the HMDA data that are not geography, income, or lender based, may be used to process the HMDA data. The additional rules may include, for example, an interest rate spread for determining which loans belong to the sub-prime market and which loans belong to the prime market. Another example of an additional rule may be a rule for categorizing "conforming" and "non-conforming" loans. For example, the rule may set forth that if a loan was originally sold to a GSE, the loan is conforming. If not, other HMDA data 120 or data derived from processes 500, 600, or 700 may be used to determine if the loan is conforming.

An example of a rule developed in SAS and that may be used to normalize attributes of the HMDA data that are not geography, income, or lender based is illustrated below.

```
libname hmda 'e:\hmda';

data hmda;
    length ASOFDT 4; length AGENCY $ 1; length RESPID $ 10; length SEQNO 8; length LNTYPE $ 1;
    length LIMIT $ 1; length PROPTYPE $ 1; length RATE $ 1; length OCCPNCY $ 1;
    length LNPURP $ 1; length PREAPPRV $ 1; length MINORITY $ 1; length RACE $ 1;
    length ACTION $ 1; length PURTYPE $ 1; length LNAMT 8; length MSAPROP $ 5;
    length FIPCODE $ 2; length COUNTY $ 3; length CENSUSNO $ 7; length APPLETHN $ 1;
    length COAPETHN $ 1; length APPRACE1 $ 1; length APPRACE2 $ 1; length APPRACE3 $ 1;
    length APPRACE4 $ 1; length APPRACE5 $ 1; length COAPRACE1 $ 1; length COAPRACE2 $ 1;
    length COAPRACE3 $ 1; length COAPRACE4 $ 1; length COAPRACE5 $ 1; length APPLSEX $ 1;
    length COAPSEX $ 1; length DENIAL1 $ 1; length DENIAL2 $ 1; length DENIAL3 $ 1;
    length HOEPASTAT $ 1; length LIENSTAT $ 1; length EDITSTAT $ 1; length APDTPRE $ 1;
    length STATE $ 2; length APPLINCM 8; length RATESPREAD 8; length POP 8; length PCTMINPOP 8;
    length HUDMFI 8; length PCTTRCTMFI 8; length NUMOOUNITS 8; length NUM1TO4UNITS 8;
    length MFI 8; length LOWMOD $ 1; length UNDRSRV $ 1; length SPECIAL $ 1;
    length UNDRSRVD 8; length MSA2005 $ 4; length MSA2k2005 $ 5; length STFIPS $ 2;
    length CNTY2005 $ 3; length TRACT90 $ 6; length TRACT2k $ 6; length SERVED $ 1;
    set hmda.hmda (rename=(conform=LIMIT subprime=RATE applrace=APPRACE1 coaprace=COAPRACE1));
run;

proc sort data=hmda;
    by ASOFDT AGENCY RESPID;
run;

data hmda.hmda9003 to 04(drop=CODE);
    merge hmda(in=a)
        hmda.subprime(in=b);
``` by ASOFDT AGENCY RESPID;
if a;

** Eliminating double reporting by keeping AGENCY='7' & RESPID='2294709990' for CONSECO;
   if ASOFDT=2002 and AGENCY='3' and RESPID='0000034536' then DELETE;

** Determining Subprime Rate or Manufactured Home Lender and Property Type;
   if LNPURP in ('1', '2 ', '3 ') then PROPTYPE='1';
   else PROPTYPE='3';
   if ASOFDT>1992 then do;
   if b=0 then RATE='0'; ** Not in Subprime list;
   else do;
   if CODE='2' then PROPTYPE='2';
   else if PURTYPE in ('1','3') then RATE='0'; ** If Subprime & GSE then Prime;
   else RATE='1 ';
   end;
   end;

** Determining Race by applying racial matrix;
   if apprace1 in ('1','2','3','4','5','6') then do;
   if coaprace1=apprace1 or coaprace1 not in ('1','2','3','4','5','6') then RACE=apprace1;
   else RACE='0'; * Joint/multiracial household;
   end;
   else if apprace1 not in ('1','2','3','4','5','6') then do;
   if coaprace1 not in then RACE='9';
   else RACE=coaprace1;
   end;

** Determining Minority;
   if RACE='9' then MINORITY='9';
   else if RACE='5' then MINORITY='0';
   else MINORITY='1';

run;

In step 850, the normalized HMDA data may be summarized and structured into data cubes. A data cube is a data structure that allows for fast analysis of the underlying data. The summarizing of the data may be performed using cross-tabulations techniques. For example, the normalized HMDA data may be considered as two types, metrics such as loan amounts, and categories such as minority status. For each category available in the HMDA data, the HMDA data analysis tool 470 may create every possible combination. For example, assuming the HMDA category "minority status" includes the values "minority status A" and "minority status B," and the HMDA category loan type includes the categories "type 1" and "type 2." The HMDA data analysis tool 470 may determine all four permutations of these two categories (A1, A2, B1, B2). Then, for each permutation, metrics such as the loan amount and count may be summarized for the permutation.

Derived categories such as conforming/nonconforming or HUD-goal eligible may also be used for the above-described permutations, and metrics may be calculated for each permutation. Other categories that may be derived include lien status, conforming flag, conforming ratio distributions, prime/sub-prime flag, geographic flags, minority flag, goal flags (low or moderate-income, underserved, and special affordable), merger-adjusted lender rollup, loan-to-income ratios, etc.

Finally, the metrics may be summarized using a report procedure at the most granular level, also known as a "handle," defined as a unique combination of all categorical variables or attributes. In step 860, the summarized and normalized HMDA data may be exported into an application. The application may be a spreadsheet application, such as Microsoft Excel. Open Database Connectivity (ODBC) may be used to provide a standard software application programming interface (API) for linking the HMDA data to the application.

An example of a handle from the summarized and normalized HMDA data is illustrated in FIG. 9. In FIG. 9, handles (Handle 1, Handle 2, and Handle 3) have been created for private HMDA data 120 reported during the years 1996, 1997, and 1998. In addition, the categorical variables of the handles include a subgroup of attribute variables and a subgroup of metric variables. The attribute variables subgroup corresponds to the fields of LAR 200 illustrated in FIG. 2A. An optional translation has also been performed to translate the various listing of codes in FIG. 2B from a numerical representation to an alphabetical representation for purposes of simplifying analysis. For example, code 1 (one-to-four family) used in the property type group of FIG. 2B has been translated to code F.

The summarized and normalized HMDA data may be further aggregated into pivot tables and pivot charts for further analysis. For example, pivot tables and pivot charts may be used to analyze the HMDA data within an application, such as a spreadsheet application. FIGS. 10A and 10B illustrate an example of such a pivot table.

Other HMDA record attributes, like gender, applications, reason for denial, accept rates, may be incorporated into the HMDA data analysis tool 470. Additionally, lenders may use internal, not publicly available data, as an input to process 800 to expand the analytical capabilities of the HDMA data analysis tool 470. Likewise, market data connectors may be created through analytical integration with other market monitoring tools. Through the use of the HMDA data analysis tool 470, patterns of primary market behaviors may be identified and understood.

Instructions may be stored on a computer-readable storage medium which, when executed by a processor, such as a processor in computer 170, performs the methods described in paragraphs 50-81.

The foregoing description of possible implementations and embodiments consistent with the present invention does not represent a comprehensive list of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

The invention claimed is:

1. A computer-implemented method of normalizing public HMDA data received from a federal agency, the method comprising:
   receiving, by a processor, Home Mortgage Disclosure Act (HMDA) data including at least one of HMDA data reports and loan-level public HMDA data, the HMDA data having loan information that varies as a function of time and that is provided by multiple financial institutions;
   correcting, by the processor, errors in the HMDA data;

normalizing, by the processor, the HMDA data across variations in the information, wherein normalizing comprises:
   accessing a first database storing data indicative of which HMDA data is provided by each of the multiple financial institutions,
   accessing a second database storing the names of the multiple financial institutions and associated identifying tags that identify relationships among the multiple financial institutions,
   reducing, based on the data stored in the first database and the names of the multiple financial institutions and the associated identifying tags stored in the second database, a total number of the names of the multiple financial institutions, and
   reassigning, based on the reduced total number of the names of the multiple financial institutions, the data stored in the first database;
summarizing, by the processor, the normalized HMDA data; and
outputting, by the processor, the summarized and normalized HMDA data to an application for analysis.

2. The method of normalizing HMDA data according to claim 1, wherein correcting errors comprises correcting at least one of a missing census tract number and an improper data code.

3. The method of claim 1, wherein normalizing the HMDA data further comprises:
   retrieving geographic reference data related to the HMDA data;
   applying rules to the geographic reference data to normalize current census tract data to previous census tract data, current and previous census tract data to counties, and county information to metropolitan statistical area data; and
   outputting normalized census tracts to metropolitan statistical area data.

4. The method of claim 3, wherein normalizing the HMDA data further comprises:
   retrieving data related to a goal required of a government-sponsored enterprise and the normalized census tracts to metropolitan statistical area data;
   applying rules to the retrieved data to determine loans within census tracts that meet the required goal; and
   identifying loans that meet the required goal.

5. The method of claim 1, wherein normalizing the HMDA data further comprises:
   applying rules to the accessed data indicative of which HMDA data is provided by each of the financial institutions to determine a market share of a first financial institution in a specified year and to include the market share of other financial institutions acquired by the first financial institution after the specified year.

6. The method of claim 1, wherein normalizing the HMDA data further comprises:
   applying rules to the HMDA data to identify loans associated with the HMDA data belonging to the sub-prime market and loans belonging to the prime market.

7. The method of claim 1, wherein normalizing the HMDA data further comprises:
   applying rules to the HMDA data to identify conforming loans or non-conforming loans.

8. A computer-readable storage medium including program instructions which, when executed by a processor, performs a method of normalizing public Home Mortgage Disclosure Act (HMDA) data received from a federal agency, the method comprising:
   receiving HMDA data including at least one of HMDA data reports and loan-level public HMDA data, the HMDA data having loan information that varies as a function of time and that is provided by multiple financial institutions;
   correcting errors in the HMDA data;
   normalizing the HMDA data across variations in the information, wherein normalizing comprises:
      accessing a first database storing data indicative of which HMDA data is provided by each of the multiple financial institutions,
      accessing a second database storing names of the multiple financial institutions and associated identifying tags that identify relationships among the multiple financial institutions,
      reducing, based on the data stored in the first database and the names of the multiple financial institutions and the associated identifying tags stored in the second database, a total number of the names of the multiple financial institutions, and
      reassigning, based on the reduced total number of the names of the multiple financial institutions, the data stored in the first database;
   summarizing the normalized HMDA data; and
   outputting the summarized and normalized HMDA data to an application for analysis.

9. The storage medium of claim 8, wherein correcting errors comprises correcting at least one of a missing census tract number and an improper data code.

10. The storage medium of claim 8, wherein normalizing the HMDA data further comprises:
   retrieving geographic reference data related to the HMDA data;
   applying rules to the geographic reference data to normalize current census tract data to previous census tract data, current and previous census tract data to counties, and county information to metropolitan statistical area data; and outputting normalized census tracts to metropolitan statistical area data.

11. The storage medium of claim 10, wherein normalizing the HMDA data further comprises:
   retrieving data related to a goal required of a government-sponsored enterprise and the normalized census tracts to metropolitan statistical area data;
   applying rules to the retrieved data to determine loans within census tracts that meet the required goal; and
   identifying loans that meet the required goal.

12. The storage medium of claim 8, wherein normalizing the HMDA data further comprises:
   applying rules to the accessed data indicative of which HMDA data is provided by each of the financial institutions to determine the market share of a first financial institution in a specified year and to include the market share of other financial institutions acquired by the first financial institution after the specified year.

13. The storage medium of claim 8, wherein normalizing the HMDA data further comprises:
   applying rules to the HMDA data to identify loans associated with the HMDA data belonging to the sub-prime market and loans belonging to the prime market.

14. The storage medium of claim 8, wherein normalizing the HMDA data further comprises:
   applying rules to the HMDA data to identify conforming loans or non-conforming loans.

15. A Home Mortgage Disclosure Act (HMDA) data analysis tool to perform a normalizing process and analysis of public HMDA data, received from a federal agency comprising:
- a geographic translator to perform a cross-year process to normalize geographic information on locations of properties reported in the HMDA data provided by multiple financial institutions;
- an income translator to perform a cross-year process to normalize HUD goals required of government-sponsored enterprises relative to the HMDA data;
- a lender translator for to access a first database storing data indicative of which HDMA data is provided by each of the multiple financial institutions and a second database storing names of the multiple financial institutions and associated identifying tags that identify relationships among the multiple financial institutions, and to perform a cross-year process to normalize lender information reported in the HMDA data by: reducing, based on the data stored in the first database and the names of the multiple financial institutions and the associated identifying tags stored in the second database, a total number of the names of the multiple financial institutions, and reassigning, based on the reduced total number of the names of the multiple financial institutions, the data stored in the first database;
- a rules repository for storing rules for performing the normalization process; and
- a rules processor for executing the rules.

16. The HMDA data analysis tool of claim 15, wherein the cross-year process performed by the geographic translator further comprises:
- determining changes in HMDA reporting standards and formatting of the HMDA data, data definitions, and a time period when a change occurred; and
- normalizing the HMDA data based on the determined change and the time period of the change.

17. The HMDA data analysis tool of claim 15, wherein the determined change is a change in census tract data.

18. The HMDA data analysis tool of claim 15, wherein the determined change is a change in a metropolitan statistical area definition.

19. The HMDA data analysis tool of claim 15, wherein the cross-year process performed by the income translator further comprises:
- analyzing the HMDA data in relation to the HUD goals;
- and flagging loans meeting the goals required of government-sponsored enterprises by the U.S. Department of Housing and Urban Development.

20. The HMDA data analysis tool of claim 15, wherein the cross-year process performed by the lender translator further comprises:
- determining a market share of a financial institution for a particular year; and
- analyzing the HMDA data in relation to the determined market share.

* * * * *